(12) United States Patent
Fulwyler et al.

(10) Patent No.: US 8,003,376 B2
(45) Date of Patent: Aug. 23, 2011

(54) CAPILLARY ARRAY AND RELATED METHODS

(75) Inventors: Mack J. Fulwyler, Sarasota, FL (US); Joe W. Gray, San Francisco, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 12/774,679

(22) Filed: May 5, 2010

(65) Prior Publication Data

US 2010/0279899 A1 Nov. 4, 2010

Related U.S. Application Data

(62) Division of application No. 11/293,047, filed on Dec. 1, 2005, now Pat. No. 7,741,104, which is a division of application No. 10/960,224, filed on Oct. 6, 2004, now Pat. No. 6,989,237, which is a division of application No. 10/418,384, filed on Apr. 17, 2003, now Pat. No. 6,818,184, which is a division of application No. 09/652,873, filed on Aug. 31, 2000, now Pat. No. 6,610,499.

(51) Int. Cl.
*C12M 1/36* (2006.01)
*C12M 1/38* (2006.01)
*C12M 3/00* (2006.01)
*C12M 1/34* (2006.01)

(52) U.S. Cl. .................. 435/287.9; 435/7.1; 435/283.1; 435/287.1; 435/287.2; 435/288.6

(58) Field of Classification Search ............... 435/287.9, 435/7.1, 283.1, 287.1, 287.2, 288.6; 436/518, 436/807; 422/50, 430, 68.1
See application file for complete search history.

(56) References Cited

U.S. PATENT DOCUMENTS 3,479,141 A 11/1969 Smythe et al.
(Continued)

FOREIGN PATENT DOCUMENTS

EP 0 969 083 1/2000
(Continued)

OTHER PUBLICATIONS

US Office Action Mar. 18, 2002 issued in U.S. Appl. No. 09/652,873.
(Continued)

*Primary Examiner* — Melanie J Yu
(74) *Attorney, Agent, or Firm* — Weaver Austin Villeneuve & Sampson LLP

(57) ABSTRACT

The invention provides methods and devices for detecting the presence of one or more target analytes in a sample employing a channel having affixed therein one or more binding partners for each target analyte. Assays are carried out by transporting the sample through the channel to each successive binding partner so that target analyte present in said sample binds to the corresponding binding partner. The sample is then transported beyond the binding partner(s), followed by detection of any target analyte bound to each binding partner. In one embodiment, binding efficiency is increased by the use of segmented transport, wherein a first bolus or bubble of a fluid that is immiscible with the sample precedes the sample during transport and a second bolus or bubble of a fluid that is immiscible with the sample follows the sample. Many configurations are possible for the device of the invention. A preferred device includes: a substrate with a channel formed in its surface, and a cover element that overlies and seals the channel. Binding partner(s) are affixed to the surface of the cover element facing the channel lumen.

17 Claims, 2 Drawing Sheets

U.S. PATENT DOCUMENTS

| | | | |
|---|---|---|---|
| 3,635,680 A * | 1/1972 | Peoples et al. | 435/7.25 |
| 3,804,593 A * | 4/1974 | Smythe et al. | 436/53 |
| 4,253,846 A | 3/1981 | Smythe et al. | |
| 4,281,062 A | 7/1981 | Kallis | |
| 4,685,463 A | 8/1987 | Williams | |
| 4,753,775 A * | 6/1988 | Ebersole et al. | 422/81 |
| 4,853,336 A | 8/1989 | Saros et al. | |
| 4,853,366 A * | 8/1989 | Evans et al. | 503/227 |
| 5,268,147 A * | 12/1993 | Zabetakis et al. | 422/82 |
| 5,399,497 A * | 3/1995 | Kumar et al. | 436/53 |
| 5,494,562 A | 2/1996 | Maley et al. | |
| 5,622,868 A | 4/1997 | Clarke et al. | |
| 5,632,957 A | 5/1997 | Heller et al. | |
| 5,656,502 A | 8/1997 | MacKay et al. | |
| 5,776,672 A | 7/1998 | Hashimoto et al. | |
| 5,804,384 A | 9/1998 | Muller et al. | |
| 5,866,345 A | 2/1999 | Wilding et al. | |
| 5,942,443 A | 8/1999 | Parce et al. | |
| 5,952,173 A | 9/1999 | Hansmann et al. | |
| 6,046,056 A | 4/2000 | Parce et al. | |
| 6,130,098 A | 10/2000 | Handique et al. | |
| 6,210,910 B1 | 4/2001 | Walt et al. | |
| 6,225,047 B1 | 5/2001 | Hutchens et al. | |
| 6,348,354 B1 * | 2/2002 | Adolfsen et al. | 436/53 |
| 6,395,557 B1 | 5/2002 | Fouillet et al. | |
| 6,473,171 B1 | 10/2002 | Buttry et al. | |
| 6,610,499 B1 | 8/2003 | Fulwyler et al. | |
| 6,767,706 B2 | 7/2004 | Quake et al. | |
| 6,818,184 B2 | 11/2004 | Fulwyler et al. | |
| 6,989,237 B2 | 1/2006 | Fulwyler et al. | |
| 7,741,104 B2 | 6/2010 | Fulwyler et al. | |
| 2001/0029049 A1 | 10/2001 | Walt et al. | |
| 2005/0121322 A1 | 6/2005 | Say et al. | |

FOREIGN PATENT DOCUMENTS

| | | |
|---|---|---|
| GB | 1 231 482 | 5/1971 |
| WO | WO 98/43739 | 10/1998 |
| WO | WO 99/42809 | 8/1999 |
| WO | WO 02/18949 | 3/2002 |

OTHER PUBLICATIONS

US Office Action Jul. 31, 2002 issued in U.S. Appl. No. 09/652,873.

US Notice of Allowance Jan. 14, 2003 issued in U.S. Appl. No. 09/652,873.

US Office Action dated Nov. 18, 2003 issued in U.S. Appl. No. 10/418,384.

US Notice of Allowance dated Jul. 6, 2004 issued in U.S. Appl. No. 10/418,384.

US Office Action dated Jan. 27, 2005 issued in U.S. Appl. No. 10/960,224.

US Notice of Allowance dated Jul. 29, 2005 issued in U.S. Appl. No. 10/960,224.

US Office Action dated Jun. 5, 2008 issued in U.S. Appl. No. 11/293,047.

US Office Action Final dated Jan. 5, 2009 issued in U.S. Appl. No. 11/293,047.

US Office Action dated Aug. 6, 2009 issued in U.S. Appl. No. 11/293,047.

US Notice of Allowance dated Feb. 8, 2010 issued in U.S. Appl. No. 11/293,047.

PCT International Search Report dated Oct. 7, 2002 issued in WO 02/018949 (PCT/US2001/025775).

PCT Written Opinion dated Nov. 22, 2002 issued in WO 02/018949 (PCT/US2001/025775).

PCT International Preliminary Examination Report dated Jan. 16, 2003.

European Office Action dated Feb. 13, 2006 issued in EP 01 965 979.6.

European Office Action dated Sep. 7, 2007 issued in EP 01 965 979.6.

European Communication under Rule 71 (3) EPC (Intention to Grant) dated Mar. 3, 2008 issued in EP 01 965 979.6.

European Decision to Grant dated Sep. 18, 2008 issued in EP 01 965 979.6.

DeRisi, Joseph et al., (Dec. 1996) "Use of a cDNA Microarray to Analyse Gene Expression Patterns in Human Cancer", *Nature Genetics* 14(4):457-460.

Effenhauser, C.S. et al, (1997) "Integrated Capillary Electrophoresis on Flexible Silicone Microdevices: Analysis of DNA Restriction Fragments and Detection of Single DNA Molecules on Microchips", *Anal. Chem.* 69:3451-3457.

Fodor, Stephen P.A. et al., (Feb. 1991) "Light-directed, Spatially Addressable Parallel Chemical Synthesis", *Science* 251:767-773.

Freemantle, Michael, (1999) "Downsizing Chemistry", *Science/Technology* 77(8):27-36.

Gallardo, Benedict S. et al., (1999) "Electrochemical Principles for Active Control of Liquids on Submimillimeter Scales", *Science* 283:(5398):57-60.

Gilles, Patrick N. et al., (Apr. 1999) "Single Nucleotide Polymorphic Discrimination by an Electronic Dot Blot Assay on Semiconductor Microchips", *Nature Biotechnology* 17:365-370.

Guo, Zhen et al., (1994) "Direct Fluorescence Analysis of genetic Polymorphisms by Hybridization With Oligonucleotide Arrays on Glass Supports", *Nucleic Acids Research* 22(24):5456-5465.

Kallioniemi, 0-P, et al., (Aug. 1, 1994) "Optimizing Comparative Genomic Hybridization for Analysis of DNA Sequence Number Changes in Solid Tumors", *Genes, Chromosomes & Cancer, XX, XX*, 10(4):231-243.

Kallioniemi, A., (Oct. 30, 1992) "Comparative Genomic Hybridization for Molecular Cytogenetic Analysis of Solid Turmors", *Science, American Association for the Advancement of Science*, U.S. 258(5083) 818-821.

Kallioniemi,, A. et al. (Mar. 1, 1994) "Detection and Mapping of Amplified DNA Sequences in Breast Cancer by Comparative Genomic Hybridization", *Proceedings of the National Academy of Sciences of USA, National Academy of Science*, Washington, US, 91:2156-2160.

Kononen, Juha et al., (Jul. 1998) "Tissue Microarrays for High-Throughput Molecular Profiling of Tumor Specimens", *Nature Medicine* 4(7):844-847.

Manoir Du, S. et al., (1995) "Quantitative Analysis of Comparative Genomic Hybridization", *Cytometry, Alan Liss*, New York, 19(1):27-41.

Pinkel, Daniel et al., (Oct. 1998) "High Resolution Analysis of DNA Number Variation Using Comparative Genomic Hybridization to Microarrays", *Nature Genetics* 20:207-211.

Pollock, Jonathan R. et al., (Sep. 1999) "Genome-wide Analysis of DNA—number Changes Using cDNA Microarrays", *Nature Genetics* 23:41-46.

Rice, C.L. et al., (1965) "Electrokinetic Flow in a Narrow Cylindrical Capillary", *J. Phys. Chem.* 69:4017-4024.

Shalon, Dari et al., (Jul. 1996) "A DNA Microarray System for Analyzing Complex DNA Samples Using Two-color Fluorescent Probe Hybridization", *Genome Research* 6(7):639-645.

Skeggs, L.T. et al., (1957) "An Automatic Method for Colorimetric Analysis", *American Journal of Clinical Pathology* 28(3):311-322.

Snyder et al., (1976) "Dispersion in Segmented Flow Through Glass Tubing in a Continuous-Flow Analysis: The Ideal Model", *Anal. Chem.* 48(7):1018-22.

Snyder, L.R. et al., (1976) "Dispersion in Segmented Flow Through Glass Tubing in Continuous-Flow Analysis: The Nonideal Model", *Anal. Chem.*48(7):1023-27.

* cited by examiner

US 8,003,376 B2

CAPILLARY ARRAY AND RELATED METHODS

FIELD OF THE INVENTION

This invention relates to the field of diagnostics. In particular this invention provides devices and methods that allow rapid detection and/or quantitation of multiple analytes.

BACKGROUND OF THE INVENTION

Tumors progress through the continuous accumulation of genetic and epigenetic changes that enable escape from normal cellular and environmental controls. These aberrations may involve genes that affect cell-cycle control, apoptosis, angiogenesis, adhesion, transmembrane signaling, DNA repair, and genomic stability. A number of genes that contribute to this process have already been discovered. However, large-scale analysis of gene expression and gene copy number suggest that the number of such genes may be large, perhaps strikingly so, and many important cancer-related genes remain to be discovered. Identification of recurrent changes in gene copy number, organization, sequence or expression is one common approach to identification of genes that play a role in cancer. Large-scale array analysis techniques for assessment of genome copy number, expression level and DNA sequence polymorphisms are now accelerating the rate at which tumors can be analyzed. These same technologies are promising as diagnostic platforms that can be employed to assess specific changes in individual tumors thereby permitting selection of therapeutic strategies that are optimal for these tumors.

Array based comparative genomic hybridization (CGH), allows the changes in relative DNA sequence copy number to be mapped onto arrays of cloned probes. In array CGH, total genome DNAs from tumor and reference samples are independently labeled with different fluorochromes or haptens and co-hybridized to normal chromosome preparations along with excess unlabeled Cot-1 DNA to inhibit hybridization of labeled repeated sequences. The principle advantages of CGH are that it maps changes in copy number throughout a complex genome onto a normal reference genome so the aberrations can be easily related to existing physical maps, genes and genomic DNA sequence. In addition, array CGH allows quantitative assessment of DNA sequence dosage from one copy per test genome to hundreds of copies per genome. Initial work involved CGH to arrays comprised of targets spanning >100 kb of genomic sequence, such as BACs. More recently, CGH to cDNA arrays has been demonstrated. cDNA arrays are attractive for CGH since they are increasingly available and carry a very large number of clones. In addition, the same array can be used to assess expression and copy number.

Single nucleotide polymorphisms (SNPs) also can be detected efficiently by hybridization of fluorescently labeled PCR amplified representations of the genome to arrays comprised of oligonucleotides. Both alleles of each of several thousand SNP markers and single-base mismatch targets may be presented on an array. The stringency of the hybridization reaction is adjusted so that hybridization is diminished if a single base mismatch exists between the probe and oligonucleotide substrate. Thus, its hybridization signature can determine the presence or absence of an allele in the hybridization mixture. This technique is rapid and scales well to genome-wide assessments of linkage or LOH (loss of homogeneity).

Enormous progress has been made in recent years in the development and DNA sequence characterization of cDNA clones from the human, mouse and other model organisms. In humans, these data have been computationally assembled into over 8000 genes and 83,000 clusters. The cDNA clones associated with these sequences are publicly available. These clones and their associated sequences form the basis for a powerful microarray approach to large-scale analysis of gene expression. In-this approach, labeled mRNA samples are hybridized to arrays of cDNA clones or oligonucleotides derived from the associated sequences. The arrays may be on silicon or membrane substrates. The labeled probes may be labeled radioactively or with fluorescent reagents so that the resulting hybridization signals can be detected using autoradiography, phosphoimaging or fluorescence imaging.

cDNA and oligonucleotides arrays have been made using robots to move DNA from microliter trays to silicon substrates or to nylon membranes. This approach is flexible and is especially well-suited to production of custom arrays, but also has been applied to make large-scale arrays carrying 40,000 different clones. An alternative is to synthesize oligonucleotide arrays directly on silicon substrates using photolithographic approaches. These techniques work by projecting light through a photolithographic mask onto the synthesis substrate. Single oligonucleotide arrays on silicon substrates have been constructed with elements representing more than 40,000 genes/ESTs.

The conventional array approaches described above, while powerful, are limited by the inefficient manner in which probe is used and by the long hybridization times required. These limitations arise from the need to distribute probe molecules over a large surface during hybridization. As a result, most probe molecules are far from the targets to which they might hybridize and sensitivity suffers. This reduces the rate at which hybridization occurs and results in most probe molecules never reaching the targets to which they might bind, a phenomenon that becomes increasingly limiting for long oligonucleotides with slow diffusion rates. This problem can be reduced by using relatively large amounts of probe, vigorous mixing and using space-filling reagents such as dextran sulfate in the hybridization mixtures. However, substantial improvement is still needed to allow practical use of DNA or RNA recovered from small amounts of material (e.g., collected by microdissection) and to increase the rate of hybridization.

SUMMARY OF THE INVENTION

The invention provides a method of detecting the presence of a first target analyte in a sample. The method employs a channel having affixed therein a first binding partner for the first target analyte. The binding partner is preferably an antibody, a binding protein, or a nucleic acid. The method entails transporting the sample through the channel to the first binding partner so that first target analyte present in the sample binds to the first binding partner. A first bolus or bubble of a fluid that is immiscible with the sample precedes the sample during transport and a second bolus or bubble of a fluid that is immiscible with the sample follows the sample during transport. The sample is then transported beyond the first binding partner, and the presence of any first target analyte bound to the first binding partner is detected.

In a preferred embodiment, the method employs a channel formed in a surface of a substrate. In a variation of this embodiment, a cover element overlies and seals the channel and has a first surface facing the channel lumen. Preferably, the cover element is removably attached to the substrate. In a particularly preferred variation of this embodiment, the channel has a hydrophobic lumenal surface. In this case, the first surface of the cover element is preferably hydrophilic. When a cover element is present, the first binding partner is preferably affixed to the first surface of the cover element.

In a preferred embodiment, the immiscible fluids preceding and following the sample are gas bubbles. In a particularly preferred embodiment, a film of fluid about 1 µm thick or less that contains the first target analyte forms between a gas bubble following the sample and a lumenal surface of the channel or cover element, if present.

To enhance target analyte mixing and presentation to the binding partners affixed in the channel, the sample can be divided into at least two segments that are separated by a bolus or bubble of a fluid that is immiscible with the sample.

If desired, a buffer solution can follow the bolus or bubble of immiscible fluid that follows the sample. Like the sample, the buffer solution can be divided into at least two segments that are separated by a bolus or bubble of a fluid that is immiscible with the buffer solution.

The use of boluses or bubbles of immiscible fluid in the methods of the invention improves the efficiency of target analyte-binding partner binding and therefore increases the speed at which assays can be run. In preferred embodiments, the sample is transported through the channel at a velocity of at least about 1 mm/second. Any fluid transport method can be employed, but fluid is preferably transported by electrophoretic force.

The invention also provides a device including a substrate; a channel in a surface of the substrate; a cover element that overlies and seals the channel, where the cover element has a first surface facing the channel lumen; and a first binding partner for the first target analyte affixed to the first surface. The invention additionally provides a method of detecting the presence of a first target analyte in a sample that employs such a device. The method entails transporting the sample through the channel to the first binding partner so that first target analyte present in the sample binds to the first binding partner, transporting the sample beyond the first binding partner, and detecting the presence of any first target analyte bound to the first binding partner.

Another device of the invention includes a channel defined by a channel wall, a member projecting into the channel lumen, and a first binding partner for the first target analyte affixed to the member. In preferred embodiments, the channel is a capillary tube, and the member is a fiber inserted into the capillary tube.

In preferred embodiments, devices of the invention include an electrode to which a voltage can be applied to induce transport of the first target analyte toward or away from the first binding partner. Preferably, a permeation layer overlies the electrode, and the first binding partner is attached to the permeation layer.

The devices and methods of the invention are particularly well-suited for conducting multi-analyte assays, in which case, the channel has a plurality of different binding partners affixed therein at distinct locations.

In another aspect, the invention provides a method of producing an array of binding partners that entails introducing a bolus of a first binding partner into a channel, introducing a bolus or bubble of an immiscible fluid into the channel after the first binding partner, and introducing a bolus of a second binding partner into the channel after the immiscible fluid. In a preferred embodiment, the channel is a loading tube with a hydrophobic lumenal surface and each binding partner bolus is encapsulated in oil. This method additionally entails inserting the loading tube into an assay tube; transferring the first and second binding partners, separated by the bolus or bubble of immiscible fluid, into the assay tube; affixing the first and second binding partners to a lumenal surface of the assay tube at distinct locations; and withdrawing the loading tube from the assay tube.

DETAILED DESCRIPTION

Figure 1:
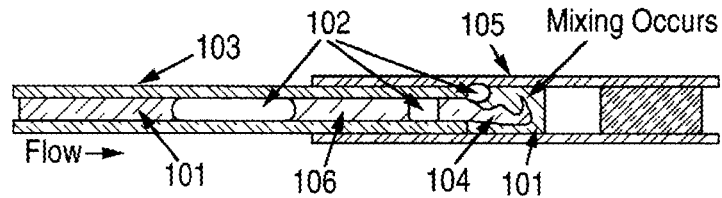
FIG. 1 illustrates a method of attaching different binding partners to distinct locations in an assay tube according to the invention.

I. Methods and Devices for Efficient Detection of Multiple Analytes

This invention provides novel methods and devices for the rapid detection and/or quantification of one or more target analytes in a sample. In a preferred embodiment, the invention includes a channel in which binding partner(s) is affixed. The binding partner(s) is specific for an analyte to be detected. Different binding partners can located at distinct locations in the channel so that binding of the corresponding target analyte can be detected and/or quantified at each binding partner location.

II. Definitions

A "target analyte" is any molecule or molecules that are to be detected and/or quantified in a sample. Preferred target analytes include biomolecules such as nucleic acids, antibodies, proteins, sugars, and the like.

The terms "binding partner" or "member of a binding pair" refer to molecules that specifically bind other molecules to form a binding complex such as antibody-antigen, lectin-carbohydrate, nucleic acid-nucleic acid, biotin-avidin, etc. In particularly preferred embodiments, the binding is predominantly mediated by non-covalent (e.g. ionic, hydrophobic, etc.) interactions. The terms "binding partner" and "member of a binding pair" apply to individual molecules, as well as to a set of multiple copies of such molecules, e.g., affixed to a distinct location of a surface. Thus, as used herein, the expression "different binding partners" includes sets of different binding partners, wherein each set includes multiple copies of one type of binding partner which differs from the binding partners present in all other sets of binding partners.

The term "antibody," as used herein, includes various forms of modified or altered antibodies, such as an intact immunoglobulin, an Fv fragment containing only the light and heavy chain variable regions, an Fv fragment linked by a disulfide bond (Brinkmann et al. (1993) *Proc. Natl. Acad. Sci. USA,* 90: 547-551), an Fab or (Fab)'2 fragment containing the variable regions and parts of the constant regions, a single-chain antibody and the like (Bird et al. (1988) *Science* 242: 424-426; Huston et al. (1988) Proc. Nat. Acad. Sci. USA 85: 5879-5883). The antibody may be of animal (especially mouse or rat) or human origin or may be chimeric (Morrison et al. (1984) *Proc Nat. Acad. Sci. USA* 81: 6851-6855) or humanized (Jones et al. (1986) *Nature* 321: 522-525, and published UK Patent Application No. 8707252).

The terms "polypeptide," "peptide" and "protein" are used interchangeably herein to refer to a polymer of amino acid residues. The terms apply to amino acid polymers in which one or more amino acid residue is an artificial chemical analogue of a corresponding naturally occurring amino acid, as well as to amino acid polymers containing only naturally occurring amino acids. The term "binding protein" refers to any protein binding partner other than an antibody, as defined above.

The terms "nucleic acid" or "oligonucleotide" or grammatical equivalents herein refer to at least two nucleotides covalently linked together. A nucleic acid of the present invention is preferably single-stranded or double stranded and will generally contain phosphodiester bonds, although in some cases, as outlined below, nucleic acid analogs are included that may have alternate backbones, comprising, for example, phosphoramide (Beaucage et al. (1993) *Tetrahedron* 49(10):1925) and references therein; Letsinger (1970) *J. Org. Chem.* 35:3800; Sprinzl et al. (1977) *Eur. J. Biochem.* 81: 579; Letsinger et al. (1986) *Nucl. Acids Res.* 14: 3487; Sawai et al. (1984) *Chem. Lett.* 805, Letsinger et al. (1988) *J. Am. Chem. Soc.* 110: 4470; and Pauwels et al. (1986) *Chemica Scripta* 26: 141 9), phosphorothioate (Mag et al. (1991) *Nucleic Acids Res.* 19:1437; and U.S. Pat. No. 5,644,048), phosphorodithioate (Briu et al. (1989) *J. Am. Chem. Soc.* 111:2321, O-methylphophoroamidite linkages (see Eckstein, *Oligonucleotides and Analogues: A Practical Approach,* Oxford University Press), and peptide nucleic acid backbones and linkages (see Egholm (1992) *J. Am. Chem. Soc.* 114:1895; Meier et al. (1992) *Chem. Int. Ed. Engl.* 31: 1008; Nielsen (1993) *Nature,* 365: 566; Carlsson et al. (1996) *Nature* 380: 207). Other analog nucleic acids include those with positive backbones (Denpcy et al. (1995) *Proc. Natl. Acad. Sci. USA* 92: 6097; non-ionic backbones (U.S. Pat. Nos. 5,386,023, 5,637,684, 5,602,240, 5,216,141 and 4,469,863; Angew. (1991) *Chem. Intl. Ed. English* 30: 423; Letsinger et al. (1988) *J. Am. Chem. Soc.* 110:4470; Letsinger et al. (1994) *Nucleoside & Nucleotide* 13:1597; Chapters 2 and 3, ASC Symposium Series 580, "Carbohydrate Modifications in Antisense Research," Ed. Y. S. Sanghui and P. Dan Cook; Mesmaeker et al. (1994), *Bioorganic & Medicinal Chem. Lett.* 4: 395; Jeffs et al. (1994) *J. Biomolecular NMR* 34:17; *Tetrahedron Lett.* 37:743 (1996)) and non-ribose backbones, including those described in U.S. Pat. Nos. 5,235,033 and 5,034,506, and Chapters 6 and 7, ASC Symposium Series 580, *Carbohydrate Modifications in Antisense Research,* Ed. Y. S. Sanghui and P. Dan Cook. Nucleic acids containing one or more carbocyclic sugars are also included within the definition of nucleic acids (see Jenkins et al. (1995), *Chem. Soc. Rev.* pp 169-176). Several nucleic acid analogs are described in Rawls, C & E News Jun. 2, 1997 page 35. These modifications of the ribose-phosphate backbone may be done to facilitate the addition of additional moieties such as labels, or to increase the stability and half-life of such molecules in physiological environments.

The term "specifically binds," as used herein, when referring to a target analyte (e.g., protein, nucleic acid, antibody, etc.), refers to a binding reaction that detects the presence of the target analyte in a heterogeneous population of molecules (e.g., proteins and other biologics). Thus, under designated conditions (e.g. immunoassay conditions in the case of an antibody or stringent hybridization conditions in the case of a nucleic acid), the specified binding partner binds to its particular target analyte and does not bind in a significant amount to other molecules present in the sample.

The terms "hybridizing specifically to" and "specific hybridization" and "selectively hybridize to," as used herein refer to the binding, duplexing, or hybridizing of a nucleic acid molecule preferentially to a particular nucleotide sequence under stringent conditions. The term "stringent conditions" refers to conditions under which a probe will hybridize preferentially to its target subsequence, and to a lesser extent to, or not at all to, other sequences. Stringent hybridization and stringent hybridization wash conditions in the context of nucleic acid hybridization are sequence dependent and are different under different environmental parameters. An extensive guide to the hybridization of nucleic acids is found in, e.g., Tijssen (1993) *Laboratory Techniques in Biochemistry and Molecular Biology—Hybridization with Nucleic Acid Probes part I, chapt 2, Overview of principles of hybridization and the strategy of nucleic acid probe assays,* Elsevier, N.Y. ("Tijssen"). Generally; highly stringent hybridization and wash conditions are selected to be about 5° C. lower than the thermal melting point ($T_m$) for the specific sequence at a defined ionic strength and pH. The $T_m$ is the temperature (under defined ionic strength and pH) at which 50% of the target sequence hybridizes to a perfectly matched probe. Very stringent conditions are selected to be equal to the $T_m$ for a particular probe. An example of stringent hybridization conditions for hybridiiation of complementary nucleic acids which have more than 100 complementary residues on an array or on a filter in a Southern or northern blot is 42° C. using standard hybridization solutions (see, e.g., Sambrook (1989) *Molecular Cloning: A Laboratory Manual (2nd ed.) Vol.* 1-3, Cold Spring Harbor Laboratory, Cold Spring Harbor Press, NY), with the hybridization being carried out overnight. An example of highly stringent wash conditions is 0.15 M NaCl at 72° C. for about 15 minutes. An example of stringent wash conditions is a 0.2×SSC wash at 65° C. for 15 minutes (see, e.g., Sambrook supra) for a description of SSC buffer). Often, a high stringency wash is preceded by a low stringency wash to remove background probe signal. An example of a medium stringency wash for a duplex of, e.g., more than 100 nucleotides, is 1×SSC at 45° C. for 15 minutes. An example of a low stringency wash for a duplex of, e.g., more than 100 nucleotides, is 4× to 6×SSC at 40° C. for 15 minutes.

The term "channel" refers to a path that directs fluid flow in a particular direction. The channel can be formed as a groove or trench having a bottom and sides, or as a fully enclosed "tube." In some embodiments, the channel need not even have "sides." For example, a hydrophobic polymer can be applied to a flat surface and thereby confine and/or direct fluid flow on that surface in a narrow (e.g. hydrophilic) domain. The channel preferably includes at least one surface to which a binding partner can be affixed.

The term "microchannel" is used herein for a channel having a characteristic dimension of about 100 μm or less.

The term "characteristic dimension" is used herein to denote the dimension that determines Reynolds number (Re), as is known in the art. For a cylindrical channel, it is the cross-sectional diameter. For a rectangular channel, the characteristic dimension depends primarily on the smaller of the width and depth. For a V-shaped channel it depends on the width of the top of the "V," and so forth. Calculation of Re, and thus characteristic dimensions, for channels of various morphologies can be found in standard texts on fluid mechanics (e.g. Granger (1995) *Fluid Mechanics,* Dover, N.Y.; Meyer (1982) *Introduction to Mathematical Fluid Dynamics,* Dover, N.Y.).

The term "capillary tube" refers to a tube of small cross-sectional diameter. Open-ended capillary tubes of hydrophilic material, when contacted with water, will typically take up the water by capillary action. Capillary tubes can be fabricated of a number of materials including, but not limited to, glass, plastic, quartz, ceramic, and various silicates.

A "capillary electrophoresis tube" refers to a "capillary tube" designed for and/or typically used or intended to be used in a capillary electrophoresis device.

The term "immiscible" refers to the absence of substantial mixing between two different fluids. Thus, a first fluid is immiscible in a second when the two fluids are maintained separate fluid phases under the conditions used.

As used herein with reference to binding partners, the term "distinct location" means that each binding partner is physically separated from every other binding partner such that a signal (e.g., a fluorescent signal) from a labeled molecule bound to binding partner can be uniquely attributed to binding at that binding partner.

As used herein, the term "electrophoretic force" is the force whereby ions in a fluid medium are transported toward an oppositely charged electrode in response to a voltage gradient.

The term "electroosmotic force" refers to that force whereby charges in a channel wall create a sheath of counterions in the adjacent fluid that moves the fluid column and solutes contained therein along the channel in response to a voltage gradient.

The term "array" refers to a collection of elements, wherein each element is uniquely identifiable. For example, the term can refer to a substrate bearing an arrangement of elements, such that each element has a physical location on the surface of the substrate that is distinct from the location of every other element. In such an array, each element can be identifiable simply by virtue of its location. Typical arrays of this type include elements arranged linearly or in a two-dimensional matrix.

III. Device Components

A. Channel

1. Channel Types and Dimensions

The device of to the invention includes a channel. Virtually any type of channel can be used in the invention. Appropriate channel types include, but are not limited to, tubes, grooves, channels formed by opposed bathers, and the like. A preferred tube is a capillary tube, such as a capillary tube suitable for use in capillary electrophoresis. In a preferred device, the channel is a groove formed in the surface of a substrate, and the device includes a cover element that overlies and seals the channel. In a variation of this embodiment, the cover element is removably attached to the substrate. In an alternative device, the channel is a capillary tube, and a member to which one or more binding partners is affixed projects into the channel lumen. In a variation of this embodiment, the member is a fiber inserted into the capillary tube.

The channel can have virtually any cross-section, e.g., circular, square, rectangular, triangular, V-shaped, U-shaped, hexagonal, octagonal, irregular, and so forth. The channel can have any convenient configuration including, but not limited to, linear, curved, serpentine (e.g., a linear portion joined by a curve or loop to another linear portion, which is itself joined by a curve or loop to a third linear branch). In a preferred embodiment, the channel defines a serpentine path, preferably one including linear portions aligned so that the long axes of the linear portions are parallel. Such a channel is referred to herein as a "folded" channel. Folded channels of the invention can include as many linear portions as desired. The length of each linear portion can vary, depending on the application.

Any channel material is suitable for practice of this invention so long as the material is essentially stable to the solutions passed through it. Preferred materials are capable of binding, or being derivatized to bind, the binding partner or a linker to the binding partner. In addition, in a preferred embodiment, the material is selected and/or modified so that it does not substantially bind to the target analyte. Preferred materials also do not bind, or otherwise interact with, other components (e.g., labels) whose binding would tend to increase the "background" signal in the assay methods of the invention. The same considerations apply to a cover element or member that projects into the channel lumen, if present. Glass or quartz cover elements are particularly preferred for use in the devices of the invention.

In a preferred embodiment, the lumenal surface of the channel, or a portion thereof, is sufficiently hydrophobic to reduce the tendency of an aqueous solution passing through the channel to leave behind a residual film. In a particularly preferred embodiment, the channel includes a hydrophilic lumenal surface, to which one or more binding partners is attached, and a hydrophobic lumenal surface, to which no binding partners are attached. This embodiment is preferred when sample is transported using segmented flow, as described in greater detail below. In a variation of this embodiment, the device has a channel with a hydrophobic lumenal surface and a cover element that overlies and seals the channel. A surface of the cover element facing the channel lumen is preferably hydrophilic, and one or more binding partners are affixed to this hydrophilic surface. Similarly, in a device including a member projecting into the channel lumen, a surface of the member is hydrophilic, and one or more binding partners are affixed thereto.

Particularly preferred channel/cover element/projecting member materials include, but are not limited to, glass, silicon, quartz or other minerals, plastic(s), ceramics, metals, paper, metalloids, semiconductive materials, cements, and the like. In addition, substances that form gels, such as proteins (e.g., gelatins), lipopolysaccharides, silicates, agarose and polyacrylamides can be used. A wide variety of organic and inorganic polymers, both natural and synthetic, can be employed as channel materials. Illustrative polymers include polyethylene, polypropylene, poly(4-methylbutene), polystyrene, polymethacrylate, poly(ethylene terephthalate), rayon, nylon, poly(vinyl butyrate), polyvinylidene difluoride (PVDF), polydimethylsiloxane (PDMS), silicones, polyformaldehyde, cellulose, cellulose acetate, nitrocellulose, and the like.

Polymeric channel materials can be rigid, semi-rigid, or non-rigid, opaque, semi-opaque, or transparent depending upon the use for which they are intended. For example, devices that include an optical or visual detection element are generally fabricated, at least in part, from transparent materials to allow or at least facilitate that detection. Alternatively, transparent windows of, e.g., glass or quartz can be incorporated into the device. Additionally, the polymeric materials may have linear or branched backbones and may be crosslinked or noncrosslinked. Example of particularly preferred polymeric materials include, e.g., polydimethylsiloxane (PDMS), polyurethane, polyvinylchloride (VPC), polystyrene, polysulfone, polycarbonate, and the like.

Conductive or semiconductive materials preferably include an insulating layer on the lumenal surface of the channel. This is particularly important where the device incorporates electrical elements (e.g., electrical fluid direction systems, electrical sensors, and the like).

If the device includes cover element sealing a channel, the cover element and channel materials should be selected to provide a sufficiently tight seal to prevent fluid loss during use. In one variation of this embodiment, one or more binding partners are attached to a surface of the cover element that faces the channel. After conducting an assay, any analyte(s) bound to the binding partner(s) can be detected by removing the cover element and placing the cover element in a detector. In this case, the cover element is preferably designed to facilitate analyte detection. If, for example, the analyte is labeled with a light absorbing label, such as, e.g., a fluorescent label, the cover element is preferably fabricated from a material that provides a low background signal in the detection system. Thus, where fluorescent labels are used, a material having a low level of autofluorescence, e.g., glass, is employed in the cover element. Similar considerations apply to the projecting member in devices wherein the binding partner(s) are affixed to a member, such as a fiber, projecting into the channel lumen.

The dimensions of the channel are preferably as small as possible, consistent with ease of handling and mechanical stability, to reduce the amount of sample required for an assay and to reduce the distances that analyte must travel to reach a binding partner affixed in the channel. The preferred channel characteristic dimension range is between about 0.5 µm and about 100 mm. Particularly preferred channels range from a characteristic dimension of about 1 µm to about 5 mm. More preferably, the channel is a microchannel, e.g., with a characteristic dimension between about 5 µm to about 100 µm. A most preferred characteristic dimension range is between about 5 µm and 50 µm. The channel length will depend on the channel type, configuration, characteristic dimension, and location and number of binding partners. Preferred channels are less than about 500 cm, more preferably about 1 µm to about 300 cm, and even more preferably about 1 cm to about 100 cm.

The channel can be a component of a larger article. Thus, the channel can be assembled with one or more other channels to provide a multiplicity of channels whereby a number of different assays can be run simultaneously. The channel can also be a component of an instrument that includes appropriate liquid handling, and/or detection, and/or sample processing/application functions. If desired, channel(s) according to the invention can be fabricated as part of a reusable or disposable unit that can be conveniently "plugged" into an instrument for running the assays of this invention.

It will be appreciated that the channel(s) can be provided on any of a wide variety of articles including, but not limited to a microliter dish (e.g., PVC, polypropylene, or polystyrene), a test tube (glass or plastic), a dipstick (e.g., glass, PVC, polypropylene, polystyrene, latex, and the like), a microcentrifuge tube, or a glass, silica, plastic, metallic or polymer bead. In particularly preferred embodiments, one or more channels are provided as a capillary channel on a glass or silicon slide, as a capillary tube (e.g., a capillary electrophoresis tube), or fabricated as an element of an "integrated circuit" having on board circuit elements for control of sample application, liquid flow, and/or signal detection.

2. Channel Fabrication

Methods of fabricating the channels of this invention are well known to those of skill in the art. For example, where the channel is formed of one or more capillary tubes, the capillaries can be purchased from commercial vendors (e.g. Polymicron Technologies, Tucson, Ariz.) or pulled or extruded by conventional capillary "pulling" machines.

Where the channels are fabricated on a surface, they can be formed using standard techniques, e.g., they can be machined, molded, carved, etched, laminated, extruded, or deposited, etc.

In a preferred embodiment, the channel(s) are fabricated using micromachining processes (e.g., photolithography) well known in the solid-state electronics industry. Microdevices, e.g., microchannels, are commonly constructed from semiconductor material substrates such as crystalline silicon, widely available in the form of a semiconductor wafer used to produce integrated circuits, or from glass. Fabrication of microdevices from a semiconductor wafer substrate can take advantage of the extensive experience in both surface and bulk etching techniques developed by the semiconductor processing industry for integrated circuit (IC) production.

Surface etching, used in IC production for defining thin surface patterns in a semiconductor wafer, can be modified to allow for sacrificial undercut etching of thin layers of semiconductor materials to create movable elements. Bulk etching, typically used in IC production when deep trenches are formed in a wafer using anisotropic etch processes, can be used to precisely machine edges or trenches in microdevices. Both surface and bulk etching of wafers can proceed with "wet processing," using chemicals such as potassium hydroxide in solution to remove non-masked material from a wafer. For microdevice construction, it is even possible to employ anisotropic wet processing techniques that rely on differential crystallographic orientations of materials, or to use electrochemical etch stops, to define various channel elements.

"Dry etch processing" is another technique that allows great flexibility in microdevice design. This processing technique is particularly suitable for anistropic etching of fine structures. Dry etch processing encompasses many gas or plasma phase etching techniques ranging from highly anisotropic sputtering processes that bombard a wafer with high energy atoms or ions to displace wafer atoms into vapor phase (e.g., ion beam milling), to somewhat isotropic low energy plasma techniques that direct a plasma stream containing chemically reactive ions against a wafer to induce formation of volatile reaction products.

Intermediate between high energy sputtering techniques and low energy plasma techniques is a particularly useful dry etch process known as reactive ion etching. Reactive ion etching involves directing an ion containing plasma stream against a semiconductor, or other, wafer for simultaneous sputtering and plasma etching. Reactive ion etching retains some of the advantages of anisotropy associated with sputtering, while still providing reactive plasma ions for formation of vapor phase reaction products in response to contacting the reactive plasma ions with the wafer. In practice, the rate of wafer material removal is greatly enhanced relative to either sputtering techniques or low energy plasma techniques taken alone. Reactive ion etching therefore has the potential to be a superior etching process for construction of microdevices, with relatively high anistropic etching rates being sustainable. The micromachining techniques described above, as well as many others, are well known to those of skill in the art (see, e.g., Choudhury (1997) *The Handbook of Microlithography, Micromachining, and Microfabrication,* Soc. Photo-Optical Instru. Engineer, Bard & Faulkner (1997) *Fundamentals of Microfabrication*). In addition, examples of the use of micromachining techniques on silicon or borosilicate glass chips can be found in U.S. Pat. Nos. 5,194,133, 5,132,012, 4,908,112, and 4,891,120.

In one embodiment, the channel is micromachined in a silicon (100) wafer using standard photolithography techniques to pattern the channels and connection ports. Ethylene-diamine, pyrocatechol (EDP) is used for a two-step etch and a Pyrex 7740 coverplate can be anodically bonded to the face of the silicon to provide a closed liquid system. In this instance, liquid connections can-be made on the backside of the silicon.

In other embodiments, the channel can be built up by depositing material on a substrate to form channel walls (e.g., using sputtering or other deposition technology) or the channel can be cast/molded in a material. Cast/molded channels are easily fabricated from a wide variety of materials including but not limited to various metals, plastics, or glasses. In certain preferred embodiments, the channel(s) are cast in various elastomers. (e.g., alkylated chlorosulfonated polyethylene (Acsium®), polyolefin elastomers (e.g., Engage®), chlorosulfonated polyethylene (e.g., Hypalon®), perfluoroelastomer (e.g., Kalrez®), neoprene-polychloroprene, ethylene-propylene-diene terpolymers (EPDM), chlorinated polyethylene (e.g., Tyrin®), various siloxane polymers (e.g. polydimethylsiloxane), etc.).

Microscopic channels can be produced in PDMS by a method that relies on oxidation of PDMS in oxygen plasma. (See *Anal. Chem.* 70:4974 (1998).) Oxidized PDMS seals irreversibly to other materials used in microfluidic systems, such as glass, silicon oxide, and oxidized polystyrene.

B. Binding Partners

One or more binding partners that specifically bind a target analyte to be detected are affixed in the channel(s) of the invention. The binding partner(s) used in this invention are selected based upon the target analytes that are to be identified/quantified. Thus, for example, where the target analyte is a nucleic acid the binding partner is preferably a nucleic acid or a nucleic acid binding protein. Where the target analyte is a protein, the binding partner is preferably a receptor, a ligand, or an antibody that specifically binds that protein. Where the target analyte is a sugar or glycoprotein, the binding partner is preferably a lectin, and so forth. A device of the invention can include several different types of binding partners, for example, multiple nucleic acids of different sequence and/or nucleic acids combined with proteins in the same device. The latter would facilitate, e.g., simultaneous monitoring of gene expression at the mRNA and protein levels. Other combinations of different types of binding partners can be envisioned by those of skill in the art and are within the scope of the invention. Methods of synthesizing or isolating such binding partners are well known to those of skill in the art.

1. Preparation of Binding Partners a. Nucleic Acids

Nucleic acids for use as binding partners in this invention can be produced or isolated according to any of a number of methods well known to those of skill in the art. In one embodiment, the nucleic acid can be an isolated naturally occurring nucleic acid (e.g., genomic DNA, cDNA, mRNA, etc.). Methods of isolating naturally occurring nucleic acids are well known to those of skill in the art (see, e.g., Sambrook et al. (1989) *Molecular Cloning—A Laboratory Manual* (2nd Ed.); Vol. 1-3, Cold Spring Harbor Laboratory, Cold Spring Harbor, N.Y.).

Nucleic acids useful in the invention can also be amplified from a nucleic acid sample. A number of amplification techniques have been described, but the polymerase chain reaction (PCR) is the most widely used. PCR is described in U.S. Pat. Nos. 4,683,202, 4,683,195, 4,800,159, and 4,965,188, as well as in Saiki (1985) *Science* 230:1350. PCR entails hybridizing two primers to substantially complementary sequences that flank a target sequence in a nucleic acid. A repetitive series of reaction steps involving template denaturation, primer annealing, and extension of the annealed primers by a DNA polymerase results in the geometric accumulation of the target sequence, whose termini are defined by the 5' ends of the primers. As denaturation is typically carried out at temperatures that denature most DNA polymerases (e.g., about 93° C-95° C.), a thermostable polymerase, such as those derived from *Thermus thermophilus, Thermus aquaticus* (Taq), or *Thermus flavus,*is typically used for extension to avoid the need to add additional polymerase for each extension cycle.

In a preferred embodiment, the nucleic acid is created de novo, e.g., through chemical synthesis. In a preferred variation of this embodiment, nucleic acids (e.g., oligonucleotides) are chemically synthesized according to the solid phase phosphoramidite triester method described by Beaucage and Caruthers (1981) *Tetrahedron Letts.* 22(20): 1859-1862, e.g., using an automated synthesizer, as described in Needham-VanDevanter et al. (1984) *Nucleic Acids Res.* 12: 6159-6168. Purification of oligonucleotides, where necessary, is typically performed by either native acrylamide gel electrophoresis or by anion-exchange HPLC as described in Pearson and Regnier (1983) *J. Chrom.* 255: 137-149. The sequence of the synthetic oligonucleotides can be verified using the chemical degradation method of Maxam and Gilbert (1980) in Grossman and Moldave (eds.) Academic Press, New York, *Meth. Enzymol.* 65: 499-560.

b. Antibodies/Antibody Fragments

Antibodies or antibody fragments for use as binding partners can be produced by a number of methods well known to those of skill in the art (see, e.g., Harlow & Lane (1988) *Antibodies: A Laboratory Manual,* Cold Spring Harbor Laboratory, and Asai (1993) *Methods in Cell Biology Vol.* 37: *Antibodies in Cell Biology,* Academic Press, Inc. N.Y.). In one embodiment, antibodies are produced by immunizing an animal (e.g., a rabbit) with an immunogen containing the epitope to be detected. A number of immunogens may be used to produce specifically reactive antibodies. Recombinant proteins are the preferred immunogens for the production of the corresponding monoclonal or polyclonal antibodies. Naturally occurring protein may also be used either in-pure or impure form. Synthetic peptides are also suitable and can be made using standard peptide synthesis chemistry (see, e.g., Barany and Merrifield, *Solid-Phase Peptide Synthesis;* pp. 3-284 in *The Peptides: Analysis, Synthesis, Biology. Vol.* 2: *Special Methods in Peptide Synthesis, Part A.,* Merrifield et al. (1963) *J. Am. Chem. Soc.,* 85: 2149-2156, and Stewart et al. (1984) *Solid Phase Peptide Synthesis,* 2nd ed. Pierce Chem. Co., Rockford, Ill.)

Methods of production of polyclonal antibodies are known to those of skill in the art. In brief, an immunogen is mixed with an adjuvant and an animals is immunized. The animal's immune response to the immunogen preparation is monitored by taking test bleeds and determining the titer of reactivity to the immunogen. When appropriately high titers of antibody to the immunogen are obtained, blood is collected from the animal and an antiserum is prepared. If desired, the antiserum can be further fractionated to enrich for antibodies having the desired reactivity. (See Harlow and Lane, supra).

Monoclonal antibodies can be obtained by various techniques familiar to those skilled in the art. Briefly, spleen cells from an animal immunized with a desired antigen are immortalized, commonly by fusion with a myeloma cell (See, Kohler and Milstein (1976) Eur. J. Immunol. 6: 511-519). Alternative methods of immortalization include transformation with Epstein Barr Virus, oncogenes, or retroviruses, or other methods well known in the art. Colonies arising from single immortalized cells are screened for production of antibodies of the desired specificity and affinity for the antigen, and yields of the monoclonal antibodies produced by such cells can be enhanced by various techniques, including injection into the peritoneal cavity of a vertebrate host. Alternatively, DNA sequences encoding a monoclonal antibody or a binding fragment thereof can be isolated by screening a DNA library from human B cells according to the general protocol outlined by Huse et al. (1989) Science, 246:1275-1281. Such sequences can then be expressed recombinantly.

Antibodies fragments, e.g., single chain antibodies (scFv or others), can also be produced/selected using phage display technology. The ability to express antibody fragments on the surface of viruses that infect bacteria (bacteriophage or phage) makes it possible to isolate a single binding antibody fragment from a library of greater than $10^{10}$ nonbinding clones. To express antibody fragments on the surface of phage (phage display), an antibody fragment gene is inserted into the gene encoding a phage surface protein (pIII) and the antibody fragment-pIII fusion protein is displayed on the phage surface (McCafferty et al. (1990) Nature, 348: 552-554; Hoogenboom et al. (1991) Nucleic Acids Res. 19: 4133-4137).

Since the antibody fragments on the surface of the phage are functional, phage bearing antigen binding antibody fragments can be separated from non-binding phage by antigen affinity chromatography (McCafferty et al. (1990) Nature, 348: 552-554). Depending on the affinity of the antibody fragment, enrichment factors of 20 fold-1,000,000 fold are obtained for a single round of affinity selection. By infecting bacteria with the eluted phage, however, more phage can be grown and subjected to another round of selection. In this way, an enrichment of 1000 fold in one round can become 1,000,000 fold in two rounds of selection (McCafferty et al. (1990) Nature, 348: 552-554). Thus, even when enrichments are low (Marks et al. (1991) J. Mol. Biol. 222: 581-597), multiple rounds of affinity selection can lead to the isolation of rare phage. Since selection of the phage antibody library on antigen results in enrichment, the majority of clones bind antigen after as few as three to four rounds of selection. Thus, only a relatively small number of clones (several hundred) need to be analyzed for binding to antigen.

Human antibodies can be produced without prior immunization by displaying very large and diverse V-gene repertoires on phage (Marks et al. (1991) J. Mol. Biol. 222: 581-597). In one embodiment, natural $V_H$ and $V_L$ repertoires present in human peripheral blood lymphocytes are isolated from unimmunized donors by PCR. The V-gene repertoires are spliced together at random using PCR to create a scFv gene repertoire which is then cloned into a phage vector to create a library of 30 million phage antibodies (Marks et al. (1991) J. Mol. Biol. 222: 581-597; Marks et al. (1993). Bio/Technology. 10: 779-783; Griffiths et al. (1993) EMBO J. 12: 725-734; Clackson et al. (1991) Nature. 352: 624-628). It is also possible to isolate antibodies against cell surface antigens by selecting directly on intact cells. The antibody fragments are highly specific for the antigen used for selection and have affinities in the 1 µM to 100 nM range (Marks et al. (1991) J. Mol. Biol. 222: 581-597; Griffiths et al. (1993) EMBO J. 12: 725-734): Larger phage antibody libraries result in the isolation of more antibodies of higher binding affinity to a greater proportion of antigens.

c. Binding Proteins

In one embodiment, the binding partner can be a binding protein. Suitable binding proteins include, but are not limited to, receptors (e.g., cell surface receptors), receptor ligands (e.g., cytokines, growth factors, etc.), transcription factors and other nucleic acid binding proteins, as well as members of binding pairs, such as biotin-avidin.

Binding proteins useful in the invention can be isolated from natural sources, mutagenized from isolated proteins, or synthesized de novo. Means of isolating naturally occurring proteins are well known to those of skill in the art. Such methods include, but are not limited to, conventional protein purification methods including ammonium sulfate precipitation, affinity chromatography, column chromatography, gel electrophoresis and the like (see, generally, R. Scopes, (1982) Protein Purification, Springer-Verlag, N.Y.; Deutscher (1990) Methods in Enzymology Vol. 182: Guide to Protein Purification, Academic Press, Inc. N.Y.). Where the protein binds a target reversibly, affinity columns bearing the target can be used to affinity purify the protein. Alternatively the protein can be recombinantly expressed with a HIS-Tag and purified using $Ni^{2+}$/NTA chromatography.

In another embodiment, the binding protein can be chemically synthesized using standard chemical peptide synthesis techniques. Where the desired subsequences are relatively short, the molecule may be synthesized as a single contiguous polypeptide. Where larger molecules are desired, subsequences can be synthesized separately (in one or more units) and then fused by condensation of the amino terminus of one molecule with the carboxyl terminus of the other molecule thereby forming a peptide bond. This is typically accomplished using the same chemistry (e.g., Fmoc, Tboc) used to couple single amino acids in commercial peptide synthesizers.

Solid phase synthesis in which the C-terminal amino acid of the sequence is attached to an insoluble support followed by sequential addition of the remaining amino acids in the sequence is the preferred method for the chemical synthesis of the polypeptides of this invention. Techniques for solid phase synthesis are described by Barany and Merrifield (1962) Solid-Phase Peptide Synthesis; pp. 3-284 in The Peptides: Analysis, Synthesis, Biology. Vol. 2: Special Methods in Peptide Synthesis, Part A., Merrifield et al. (1963) J. Am. Chem. Soc., 85: 2149-2156, and Stewart et al. (1984) Solid Phase Peptide Synthesis, 2nd ed. Pierce Chem. Co., Rockford, Ill.

In a preferred embodiment, the binding protein can also be produced using recombinant DNA methodology. Generally this involves generating a DNA sequence that encodes the binding protein, placing the DNA sequence in an expression cassette under the control of a particular promoter, expressing the protein in a host, isolating the expressed protein and, if necessary, renaturing the protein.

DNA encoding binding proteins or subsequences of this invention can be prepared by any suitable method as described above, including, for example, cloning and restriction of appropriate sequences or direct chemical synthesis by methods such as the phosphotriester method of Narang et al. (1979) Meth. Enzymol. 68: 90-99; the phosphodiester method of Brown et al. (1979) *Meth. Enzymol.* 68: 109-151; the diethylphosphoramidite method of Beaucage et al. (1981) *Tetra. Lett.,* 22: 1859-1862; and the solid support method of U.S. Pat. No. 4,458,066.

DNA encoding the desired binding protein(s) can be expressed in a variety of host cells, including *E. coli,* other bacterial hosts, yeast, and various higher eukaryotic cells, such as the COS, CHO and HeLa cells lines and myeloma cell lines. The DNA sequence encoding the binding protein is operably linked to appropriate expression control sequences for each host to produce an expression construct. For *E. coli,* examples of appropriate expression control sequences include a promoter such as the T7, trp, or lambda promoters, a ribosome binding site and preferably a transcription termination signal. For eukaryotic cells, such control sequences can include a promoter, an enhancer derived, e.g., from immunoglobulin genes, SV40, cytomegalovirus, etc., and a polyadenylation sequence, and may include splice donor and acceptor sequences.

The expression vector can be transferred into the chosen host cell by well known methods such as calcium chloride transformation for *E. coli* and calcium phosphate treatment or electroporation for mammalian cells. Cells transformed with the expression vector can be selected by resistance to antibiotics conferred by genes contained on the plasmids, such as the amp, gpt, neo and hyg genes.

Once expressed, the recombinant binding proteins can be purified using conventional techniques, as described above.

d. Sugars and Carbohydrates

Other binding partners suitable for use in the invention include sugars and carbohydrates. Sugars and carbohydrates can be isolated from natural sources, enzymatically synthesized or chemically synthesized. Specific oligosaccharide structures can be produced using the glycosyltransferases that produce these structures in vivo. Such enzymes can be used as regio- and stereoselective catalysts for the in vitro synthesis of oligosaccharides (Ichikawa et al. (1992) *Anal. Biochem.* 202: 215-238). Sialyltransferase can be used in combination with additional glycosyltransferases. For example, one can use a combination of sialyltransferase and galactosyltransferases. A number of methods of using glycosyltransferases to synthesize desired oligosaccharide structures are known. Exemplary methods are described, for instance, WO 96/32491, Ito et al. (1993) *Pure Appl. Chem.* 65:753, and U.S. Pat. Nos. 5,352,670, 5,374,541, and 5,545,553. The enzymes and substrates can be combined in an initial reaction mixture, or alternatively, the enzymes and reagents for a second glycosyltransferase cycle can be added to the reaction mixture as the first glycosyltransferase cycle nears completion. By conducting two glycosyltransferase cycles in sequence in a single vessel, overall yields are improved over procedures in which an intermediate species is isolated.

Methods of chemical synthesis are described by Zhang et al. (1999) *J. Am. Chem. Soc.,* 121(4): 734-753. Briefly, in this approach, a set of sugar-based building blocks is created with each block preloaded with different protecting groups. The building blocks are ranked by reactivity of each protecting group. A computer program then determines exactly which building blocks must be added to the reaction so that the sequence of reactions from fastest to slowest produces the desired compound.

2. Attachment of Binding Partners

Binding partner(s) are affixed in the channel(s) of the invention so as to be capable of binding the corresponding target analyte(s). The linkage between the binding partner and the substrate is preferably chemically stable under assay conditions and hydrophilic enough to be freely soluble in aqueous solutions. In addition, the linkage should preferably not produce significant non-specific binding of target analyte(s) to the substrate. Many methods for immobilizing molecules to a variety of substrates are known in the art. For example, the binding partner can be covalently bound or noncovalently attached through specific or nonspecific bonding.

If covalent bonding between a compound and the surface is desired, the surface will usually be polyfunctional or be capable of being polyfunctionalized. Functional groups that may be present on the substrate surface and used for linking can include carboxylic acids, aldehydes, amino groups, cyano groups, ethylenic groups, hydroxyl groups, mercapto groups and the like. The manner of covalently linking a wide variety of compounds to various surfaces is well known and is amply illustrated in the literature. See, for example, Ichiro Chibata (1978) *Immobilized Enzymes,* Halsted Press, New York, and Cuatrecasas, (1970) *J. Biol. Chem.* 245: 3059.

In addition to covalent bonding, various methods for non-covalently bonding a binding partner can be used. Noncovalent binding is typically, but not necessarily, nonspecific absorption of a compound to the surface. Typically, the surface is blocked with a second compound to prevent nonspecific binding of labeled assay components. Alternatively, the surface is designed such that it nonspecifically binds one component but does not significantly bind another. For example, a surface bearing a lectin such as concanavalin A will bind a carbohydrate containing compound but not an unglycosylated protein. Various substrates for use in noncovalent attachment of assay components are reviewed in U.S. Pat. Nos. 4,447,576 and 4,254,082.

Where the binding partner is a nucleic acid or a polypeptide, the molecule can be chemically synthesized in situ, if desired. In situ nucleic acid or protein synthesis typically involves standard chemical synthesis methods, substituting photo-labile protecting groups for the usual protecting groups (e.g., dimethoxy trityl group (DMT) used in nucleic acid synthesis). Irradiation of the substrate surface at discrete locations results in selective coupling of the monomer (e.g., nucleotide or amino acid) to the growing nucleic acid(s) or polypeptide(s) at the irradiated site. Methods of light-directed polymer synthesis are well known to those of skill in the art (see, e.g., U.S. Pat. No. 5,143,854; PCT Publication Nos. WO 90/15070, WO 92/10092 and WO 93/09668; and Fodor et al. (1991) *Science,* 251, 767-77).

In preferred embodiments, the binding partner is immobilized by the use of a linker (e.g. a homo- or heterobifunctional linker). Linkers suitable for joining biological binding partners are well known. For example, a nucleic acid or protein molecule may be linked by any of a variety of linkers including, but not limited to a peptide linker, a straight or branched chain carbon chain linker, or by a heterocyclic carbon linker. Heterobifunctional cross linking reagents such as active esters of N-ethylmaleimide have been widely used (see, for example, Lerner et al. (1981) *Proc. Nat. Acad. Sci.* USA, 78: 3403-3407 and Kitagawa et al. (1976) *J. Biochem.,* 79: 233-236, and Birch and Lennox (1995) *Chapter 4 in Monoclonal Antibodies: Principles and Applications,* Wiley-Liss, N.Y.).

In a preferred embodiment, the binding partner is immobilized utilizing a biotin/avidin interaction. In this embodiment, biotin or avidin with a photolabile protecting group can be placed in the channel. Irradiation of the channel at a distinct location results in coupling of the biotin or avidin to the channel at that location. Then, a binding partner bearing an avidin or biotin group, respectively, is contacted with the channel, forms a biotin-avidin complex and is thus localized in the irradiated site. To affix multiple different binding partners to different locations, this process can be repeated at each binding partner location.

Another suitable photochemical binding approach is described by Sigrist et al. (1992) *Bio/Technology*, 10: 1026-1028. In this approach, the interaction of ligands with organic or inorganic surfaces is mediated by photoactivatable polymers with carbene generating trifluoromethyl-aryl-diazirines that serve as linker molecules. Light activation of aryl-diazirino functions at 350 nm yields highly reactive carbenes, and covalent coupling is achieved by simultaneous carbene insertion into both the ligand and the inert surface. Thus, reactive functional groups are not required on either the ligand or supporting material.

Binding partners can be affixed to any location within the channel that contacts the sample during an assay according to the invention. In a preferred embodiment, a device of the invention includes a cover element that overlies and seals the channel. In this case, the binding partner can be attached to the surface of the cover element facing the channel lumen. As discussed above, in preferred embodiments, the binding partners are affixed to a lumenal surface of the channel or cover element that has a hydrophilic character. In an alternative embodiment, the binding partners are affixed to a member, such as a fiber, that projects into the channel lumen. Preferably, the binding partners are affixed to a hydrophilic surface of the fiber.

Although devices of the invention need not include more than one type of binding partner, typically a plurality of different binding partners are affixed in the channel (i.e., on the channel surface and/or on the surface of the cover element or projecting member, if present) such that each different type of binding partner occupies a distinct location. Illustrative devices of the invention contain between about 10 and about $10^6$ different types of binding partners; e.g., devices having about $10^2$, about $10^3$, about $10^4$, and about $10^5$ binding partners can readily be produced. Such devices allow the simultaneous assay of multiple target analytes.

The dimensions of, and spacing between, binding partners should allow detection of distinct signals from target analyte(s) bound to each binding partner. In an embodiment wherein binding partners are attached to a lumenal channel surface, the channel has an internal diameter of about 1 mm to about 5 mm, preferably about 2 mm, and the binding partners occupy a region that has a length (along the channel axis) of about 100 μm to about 5 mm, preferably about 1 mm, although those of skill in the art recognize that other lengths and center-to-center distances are possible. The center of each binding partner location is about 1 mm to about 5 mm, preferably about 2 mm, from the center of each adjacent binding partner location. In an alternative embodiment in which binding partners are attached to a cover element, the center-to-center distance between each binding partner location is preferably about 10 μm to about 5 mm, more preferably about 1 mm or less, even more preferably about 100 μm or less, and most preferably about 50 μm or less.

Where a removable cover element is employed, the binding partner(s) are preferably affixed to the cover element. In preferred variations of this embodiment, a plurality of different binding partners are affixed to the cover element at distinct locations facing the channel lumen to form an array of binding partners, e.g., a linear array for a single, linear channel or a two-dimensional array for a serpentine (folded) channel or for a plurality of parallel channels.

Several methods are available for affixing binding partners to the lumenal surface of a channel. For example, binding partner solutions can be aspirated into a channel separated by a bolus or bubble of a fluid that is immiscible with the binding partner solutions. Most conveniently, a first binding partner solution is aspirated into the channel, followed by a quantity of air, followed by the next binding partner solution, and so forth, to produce a series of binding partners separated by air bubbles. As binding partners are transported along the channel, some of each binding partner solution may be "carried over" from on binding partner to one or more following binding partners, leading to cross-contamination of binding partners. In this embodiment, the channel is preferably formed from a material that minimizes this phenomenon. The amount of carryover can be estimated, e.g., according to the method of Snyder and Adler (1976) *Anal. Chem.* 48:1022-1027. Briefly, the binding partner dispersion due to carryover in a tube can be calculated as follows:

$$q = 0.50 \pi L_t d_t^2 (u\eta/\gamma)^{2/3} V_s$$

where q represents the retardation of the center of the distribution of binding partner in the segment of binding partner solution and also equals the variance ($\delta^2$) of the concentration distribution after dispersion (i.e., after flow is complete). Thus, q is a dimensionless number representing the number of segments of displacement of the center of the original (i.e., pre-flow) binding partner concentration distribution. The other variables in the equation are $L_t$, which is the length of the tube through which the binding partner segment is transported; dt, which is the lumenal diameter of the tube; u, which is the velocity of segment transport through the tube; η, which is the viscosity of the binding partner solution; γ, which is the surface tension between the solution and the tube; and $V_s$, which is the volume of the segment of binding partner solution. By estimating carryover, one skilled in the art can determine whether cross-contamination of binding partners is within acceptable limits for the desired application. This will be the case for relatively short channels and/or those with a limited number of binding partners affixed therein.

In one embodiment, after loading into the channel, binding partners are affixed to a lumenal surface of the channel at distinct locations. Attachment of binding partners is conveniently achieved using photo- or heat-initiated chemistry. In this embodiment, binding partners and/or the lumenal surface of the channel bear blocking moieties that can be photo- or heat-activated to link the binding partners to the lumenal surface.

A strategy developed by Technicon Instruments Corporation can be employed to provide on-line mixing of binding partners and cross linking reagents (see, e.g., U.S. Pat. No. 4,853,336, issued Aug. 1, 1989 to Saros et al.). As applied to the present invention, and illustrated in FIG. 1, the binding partner 101 is aspirated into the loading tube 103, followed by a small bolus or bubble of immiscible fluid 102 and then a bolus of cross linking reagent 104. The loading tube 103 is then inserted into a larger diameter assay tube 105 and the binding partner, immiscible fluid, and cross linking reagent are transferred to the assay tube. The choice of tube sizes will depend one the application. In a preferred embodiment, binding partners are loaded using a Teflon® loading tube with an internal diameter of 1.8 mm and a quartz assay tube with an internal diameter of 1 mm. The bubble or bolus of immiscible fluid is too small to span the larger diameter of the assay tube, which allows mixing between the binding partner and cross linking reagent. If multiple reagents are required, they can be provided in one reagent bolus or separated by small boluses or bubbles of immiscible fluid (see, e.g., FIG. 1, showing second cross linking reagent 106).

Figure 2:
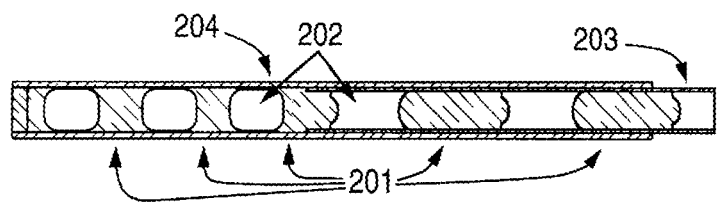
FIG. 2 illustrates a method of delivering different binding partners to distinct locations in an assay tube that minimizes "carryover" from one binding partner to the next.

An alternative embodiment that reduces carryover between one binding partner and the next is shown in FIG. 2. This technique employs a loading tube 203 with a hydrophobic (e.g., Teflon®) lumenal surface and is described, e.g., in U.S. Pat. No. 3,635,680 (issued Jan. 18, 1972 to Peoples et al.); U.S. Pat. No. 3,479,141 (issued Nov. 18, 1969 to Smythe et al.); U.S. Pat. No. 4,253,846 (issued Mar. 3, 1981 to Smythe et al.). Each binding partner bolus 201 is encapsulated in oil, which is conveniently accomplished by adding a small volume of low-density, hydrophobic oil, preferably a fluorocarbon oil, to the surface of the binding partner solution before introduction into the loading tube. The oil should be immiscible with the binding partner solution and should remain on the surface of the solution. Aspiration of a bolus of the binding partner solution through the oil layer results in encapsulation of the binding partner bolus in oil. Withdrawal of the loading tube from one oil-layered binding partner solution and transfer to the next oil-layered binding partner solution typically results in the intake of a volume of air. This process can be repeated, as desired, to produce a series of binding partner segments 201 that are separated from the wall of the loading tube 203 by an oil layer and from one another by an air bubble 202.

Loading tube 203 is then inserted into an assay tube 204, e.g., a glass or quartz capillary tube, in which the binding partners will be deposited. The binding partners, separated by boluses or bubbles of immiscible fluid, are transferred into the assay tube, typically via positive or negative pressure (exerted, e.g., via a pump, such as a peristaltic pump). The oil generally clings to the hydrophobic loading tube and/or moves to the end of the tube that is inserted into the assay tube, collecting there and, in some cases, traveling between the outer surface of the loading tube and the adjacent inner surface of the assay tube. If desired, one or more shallow grooves can be included in the outer surface of the loading tube to promote movement of the oil away from the assay tube. During this transfer, the loading tube can be moved along the assay tube, usually away from the last-deposited binding partner (i.e., in the direction of withdrawal from the assay tube), to deposit the next binding partner with minimal carry over. After deposition of all binding partners, the loading tube is withdrawn from the assay tube. In this embodiment, the lumenal surface of the assay tube can be functionalized such that binding partners bind to the surface on contact. Alternatively, photo- or heat-activation can be employed, as described above.

Excess unlinked binding partner can be removed by washing, and fixation can be carried out, if desired.

Binding partners can be affixed to a cover element using standard techniques for fabricating two-dimensional arrays, including, for example, robotic spotting, inkjet printing, and photolithographic techniques. For example, U.S. Pat. No. 5,807,522 (issued Sep. 15, 1998 to Brown and Shalon) describes a device that facilitates mass fabrication of microarrays characterized by a large number of micro-sized assay regions separated by a distance of 50-200 microns or less and a well-defined amount of analyte (typically in the picomolar range) associated with each region of the array. An alternative approach to robotic spotting uses an array of pins or capillary dispensers dipped into the wells, e.g., the 96 wells of a microtiter plate, for transferring an array of samples to a substrate.

Binding partners can be affixed to a projecting element, such as a fiber, using any of a wide variety of suitable methods known to those of skill in the art.

C. Electrode(s)

A device of the invention can optionally include one or more electrodes. In preferred embodiments, the electrode(s) are positioned in the device such that a voltage applied to the electrode(s) can induce electrophoretic and/or electroosmotic transport of a target analyte relative to a binding partner. Preferred devices employ electrophoretic transport. The use of electrodes to direct fluid transport in microfluidic devices is well known and described, for example, in U.S. Pat. No. 5,632,957 (issued May 27, 1997 to Heller et al.) (describing electrophoretic transport) and U.S. Pat. No. 6,046,056 (issued Apr. 4, 2000 to Parce et al.) (describing electroosmotic transport) and in Freemantle (1999) *Science/Technology* (1999) 77:27-36 and Gilles et al. (1999) *Nature Biotechnology* 17:365-370. In devices of the invention, electrodes can be placed at the termini of one or more channels. The application of an electric field along the length of the channel induces cations to flow toward the negative electrode, and vice versa. More typically, an electrode underlies one or more binding partners so that a voltage applied to the electrode causes target analyte to move toward and become concentrated in the vicinity of the binding partner to facilitate binding. Unbound charged components present in the sample can be induced to move away from the binding partner location by reversing the charge polarity at the electrode. Thus, target analyte can be moved from one binding partner or group of binding partners to another by sequential modulation of voltages applied to multiple electrodes.

Figure 3:
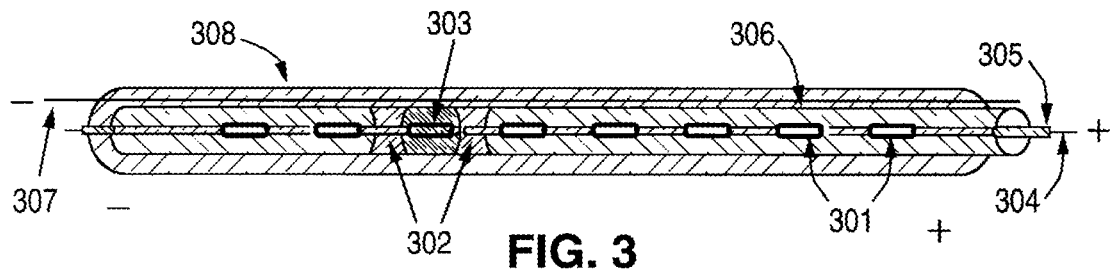
FIG. 3 is a schematic illustration of a device of invention in which binding partners are attached, via a permeation layer, to a central electrode that projects into the lumen of a channel.

An electrode for directing fluid transport is conveniently positioned on a surface of the device facing the channel lumen. In embodiments employing a cover element, the electrode is preferably positioned on the cover element. As shown in FIG. 3, in embodiments employing a member projecting into the channel lumen, the projecting member can be made of a metal or other conductive material, allowing the projecting member to serve as an electrode 304. The electrode 304 is coated with a permeation layer 305, to which binding partners 301 are attached. In a variation of this embodiment, the electrode is encircled by semipermeable tube 306, which is itself inserted into the channel lumen. Second electrode 307 is located in the annular space between inner, semipermeable tube 306 and channel wall 308. In use, the inner tube contains the sample 303 and any necessary buffer, wash, or reagent solutions, preferably separated by boluses or bubbles of immiscible fluid 302. The annular space between the inner, semipermeable tube 306 and the channel wall 308 contains a conductive fluid. The semipermeable tube is not permeable to the target analytes, but allows passage of ions and smaller molecules.

The device usually includes a lead, for example, a platinum, chromium, or gold wire, connected to the electrode. In multi-electrode embodiments, systems can be designed to modulate voltages at each electrode independently or at groups of electrodes simultaneously. In addition, systems can readily be designed to allow cycling of, and/or sequential modulation of, voltages at individual electrodes or groups of electrodes. Sequential modulation of voltages at electrodes positioned along the length of the channel is particularly preferred to induce target analyte flow along the channel.

A permeation layer preferably overlies the electrode to separate the sample components from the harsh electrochemical environment near the electrode. The permeation layer generally covers the entire surface of the electrode and has a thickness appropriate to the device, typically ranging, e.g., from about 1 nm to about 500 µm, with about 500 nm to about 50 µm being preferred. The permeation layer can be formed from any suitable material, such as a polymer, ceramic, sol-gel, layered composite material, clay, and controlled porosity glass. Preferably, the material used for the permeation layer has a porosity that excludes target analyte molecules, but allows passage of ions and smaller molecules.

In a preferred device designed for segmented flow, the permeation layer is preferably hydrophilic.

The binding partner can be attached directly to the permeation layer or the device can include an attachment layer overlying the permeation layer. The attachment layer in this case is a material that is adapted to provide a convenient surface for attaching the desired binding partner(s). Where the binding partner is a nucleic acid, the device can, for example, include an agarose permeation layer. If avidin is included in this layer, a biotinylated nucleic acid binding partner can be attached to this layer. If the device contains multiple different types of binding partners, an electrode can be positioned under each different binding partner location or an electrode can underlie several different binding partner locations.

In an alternative embodiment, electrochemical methods can be combined with redox-active surfactants, as described by Gallardo et al. (1999) 283:57, to actively control the motions and positions of aqueous and organic liquids on millimeter and smaller scales. Surfactant species generated at one electrode and consumed at another can be used to manipulate the magnitude and direction of spatial gradients in surface tension and guide liquids through fluidic networks.

IV. Integrated Assay Device

State-of-the-art chemical analysis systems for use in chemical production, environmental analysis, medical diagnostics and basic laboratory analysis are preferably capable of complete automation. Such total analysis systems (TAS) (Fillipini et al. (1991) *J. Biotechnol.* 18: 153; Garn et al (1989) *Biotechnol. Bioeng.* 34: 423; Tshulena (1988) *Phys. Scr.* T23: 293; Edmonds (1985) *Trends Anal. Chem.* 4: 220; Stinshoff et al. (1985) *Anal. Chem.* 57:114R; Guibault (1983) *Anal. Chem Symp.* Ser. 17: 637; Widmer (1983) *Trends Anal. Chem.* 2: 8) automatically perform functions from introduction of sample into the system, transport of the sample through the system, sample preparation, separation, purification and detection, including data acquisition and evaluation.

Recently, sample preparation technologies have been successfully reduced to miniaturized formats. Thus, for example, gas chromatography (Widmer et al. (1984) *Int. J. Environ. Anal. Chem.* 18: 1), high pressure liquid chromatography (Muller et al. (1991) *J. High Resolut. Chromatogr.* 14: 174; Manz et al... (1990) *Sensors & Actuators* B1:249; Novotny et al., eds. (1985) *Microcolumn Separations: Columns, Instrumentation and Ancillary Techniques J. Chromatogr. Library,* Vol. 30; Kucera, ed. (1984) *Micro-Column High Performance Liquid Chromatography,* Elsevier, Amsterdam; Scott, ed. (1984) *Small Bore Liquid Chromatography Columns: Their Properties and Uses,* Wiley, N.Y.; Jorgenson et al. (1983) *J. Chromatogr.* 255: 335; Knox et al. (1979) *J. Chromatogr.* 186:405; Tsuda et al. (1978) *Anal. Chem.* 50: 632) and capillary electrophoresis (Manz et al. (1992) *J. Chromatogr.* 593: 253; Olefirowicz et al. (1990) *Anal. Chem.* 62: 1872; Second *Int'l Symp. High-Perf. Capillary Electrophoresis* (1990) *J. Chromatogr.* 516; Ghowsi et al. (1990) *Anal. Chem.* 62:2714) have been reduced to miniaturized formats.

Similarly, in another embodiment, this invention provides an integrated assay device (e.g., a TAS) for detecting and/or quantifying one or more target analytes. The assay device comprises the channel(s) with attached binding partner(s) as described above. In addition, preferred integrated assay devices also include one or more of the following: sample application well(s) and/or injection port(s), one or more reservoirs to provide buffers and/or wash fluids, one or more electrodes that direct fluid transport, a detector, a heating or cooling element to control assay temperature, a computer controller (e.g., for control of sample application, reservoir flow switching, fluid transport, signal detection, and the like).

In a particularly preferred embodiment, the integrated assay device contains the channels) in a "removable" module that can be easily inserted and removed from the ancillary equipment Where the channel used in the device is a tube (e.g. a capillary electrophoresis tube), a conventional capillary electrophoresis device contains much of the ancillary plumbing, sample handling and delivery components, and computer controller(s) for an "integrated" assay device according to the present invention.

V. Running Assays

In general, assays are run by introducing the sample into the channel having one or more affixed binding partners. The sample is transported through the channel to the first binding partner. The sample contacts the first binding partner under conditions that allow the binding partner to specifically bind any corresponding target analytes that may be present in the sample. The sample is then transported beyond the first binding partner and the presence of target analyte bound to the first binding partner is detected.

In a preferred embodiment, the channel includes a second binding partner affixed at a location distinct from that of the first binding partner. After contact with the first binding partner, the sample is transported through the channel to the second binding partner. The second binding partner is usually, but need not be, a different type of binding partner from the first binding partner, e.g., the binding partners can be two nucleic acids of different sequence. The sample contacts the second binding partner under conditions that allow specific binding of the second target analyte, after which the sample is transported beyond the second binding partner. The presence of second target analyte bound to the second binding partner is detected, and preferably binding to the first and second binding partners is detected in a single step. In preferred embodiments, the assay employs a channel having a plurality of different binding partners affixed therein, as described above, which facilitates multi-analyte assays.

A. Sample Preparation

Virtually any sample can be analyzed using the devices and methods of this advantage. However, in a preferred embodiment, the sample is a biological sample. The term "biological sample," as used herein, refers to a sample obtained from an organism or from components (e.g., cells) of an organism. The sample may be of any biological tissue or fluid. Frequently the sample will be a "clinical sample" which is a sample derived from a patient. Such samples include, but are not limited to, sputum, cerebrospinal fluid, blood, blood fractions (e.g. serum, plasma), blood cells (e.g., white cells), tissue or fine needle biopsy samples, urine, peritoneal fluid, and pleural fluid, or cells therefrom. Biological samples may also include sections of tissues such as frozen sections taken for histological purposes.

Biological samples, (e.g., serum) may be analyzed directly or they may be subject to some preparation prior to use in the assays of this invention. Such preparation can include, but is not limited to, suspension/dilution of the sample in water or an appropriate buffer or removal of cellular debris, e.g. by centrifugation, or selection of particular fractions of the sample before analysis. Nucleic acid samples, for example, are typically isolated prior to assay and, in some embodiments, subjected to procedures, such as reverse transcription and/or amplification (e.g., polymerase chain reaction, PCR) to increase the concentration of all sample nucleic acids (e.g., using random primers) or of specific types of nucleic acids (e.g., using polynucleotide-thymidylate to amplify messenger RNA or gene-specific primers to amplify specific gene sequences).

Preferably, the biological samples are processed so that the target analyte(s) of interest are labeled with a detectable label. Detectable labels suitable for use in the present invention include any composition detectable by spectroscopic, photochemical, biochemical, immunochemical, electrical, optical or chemical means. Useful labels in the present invention include biotin for staining with labeled streptavidin conjugate, magnetic beads (e.g., Dynabeads™), fluorescent dyes (e.g., fluorescein, Texas red, rhodamine, green fluorescent protein, and the like, see, e.g., Molecular Probes, Eugene, Oreg., USA), radiolabels (e.g., $^3$H, $^{125}$I, $^{35}$S, $^{14}$C, or $^{32}$P), enzymes (e.g., horseradish peroxidase, alkaline phosphatase and others commonly used in ELISAs), and colorimetric labels such as colloidal gold (e.g., gold particles in the 40-80 nm diameter size range scatter green light with high efficiency) or colored glass or plastic (e.g., polystyrene, polypropylene, latex, etc.) beads. Patents teaching the use of such labels include U.S. Pat. Nos. 3,817,837; 3,850,752; 3,939,350; 3,996,345; 4,277,437; 4,275,149; and 4,366,241.

Suitable chromogens that can be employed in the invention include those that absorb light in a distinctive range of wavelengths so that a color can be observed or, alternatively, that emit light when irradiated with radiation of a particular wavelength or wavelength range, e.g., fluorescent molecules. Preferably, the label is a light absorbing label. Fluorescent labels are particularly preferred because they provide very strong signals with low background. Fluorescent labels are also optically detectable at high resolution and sensitivity through a quick scanning procedure. Fluorescent labels offer the additional advantage that irradiation of a fluorescent label with light can produce a plurality of emissions. Thus, a single label can provide for a plurality of measurable events.

Desirably, fluorescent labels should absorb light above about 300 nm, preferably above about 350 nm, and more preferably above about 400 nm, usually emitting at wavelengths greater than about 10 nm higher than the wavelength of the light absorbed. It should be noted that the absorption and emission characteristics of the bound dye can differ from the unbound dye. Therefore, when referring to the various wavelength ranges and characteristics of the dyes, it is intended to indicate the dyes as employed and not the dye that is unconjugated and characterized in an arbitrary solvent.

It will be recognized that fluorescent labels are not to be limited to single species organic molecules, but include inorganic molecules, multi-molecular mixtures of organic and/or inorganic molecules, crystals, heteropolymers, and the like. Thus, for example, CdSe—CdS core-shell nanocrystals enclosed in a silica shell can be easily derivatized for coupling to a biological molecule (Bruchez et al. (1998) *Science*, 281: 2013-2016). Similarly, highly fluorescent quantum dots (zinc sulfide-capped cadmium selenide) have been covalently coupled to biomolecules for use in ultrasensitive biological detection (Warren and Nie (1998) *Science*, 281: 2016-2018).

Detectable signal can also be provided by chemiluminescent and bioluminescent labels. Chemiluminescent sources include a compound which becomes electronically excited by a chemical reaction and can then emit light which serves as the detectable signal or donates energy to a fluorescent acceptor. Alternatively, luciferins can be used in conjunction with luciferase or lucigenins to provide bioluminescence.

Spin labels are provided by reporter molecules with an unpaired electron spin which can be detected by electron spin resonance (ESR) spectroscopy. Exemplary spin labels include organic free radicals, transitional metal complexes, particularly vanadium, copper, iron, and manganese, and the like. Exemplary spin labels include nitroxide free radicals.

The target analyte(s) can be labeled before, during, or after the sample contacts the channel-affixed binding partner. So-called "direct labels" are detectable labels that are directly attached to or incorporated into the target analyte prior to binding with the cognate binding partner. "Indirect labels" are attached to a component capable of binding to the target analyte or to a member of a binding pair, the other member of which is attached to the target analyte. In indirect labeling, the labeled component can be linked to the target analyte before, during or after the target analyte-containing sample contacts the binding partner. Thus, for example, the target analyte can be biotinylated and then bound to the cognate binding partner. After binding, an avidin-conjugated fluorophore can bind the biotin-bearing target analyte, providing a label that is easily detected. This embodiment is particularly preferred for labeling nucleic acids. Nucleic acids can be directly labeled via an in vitro transcription or an amplification reaction. Thus, for example, fluorescein-labeled UTP and CTP can be incorporated into the RNA produced in an in vitro transcription. For a detailed review of methods of labeling nucleic acids and detecting labeled hybridized nucleic acids see *Laboratory Techniques in Biochemistry and Molecular Biology, Vol.* 24: *Hybridization With Nucleic Acid Probes*, P. Tijssen, ed. Elsevier, N.Y., (1993)).

The labels can be attached to the target analyte directly or through a linker moiety. In general, the site of label or linker-label attachment is not limited to any specific position. For example, in nucleic acid labeling, a label may be attached to a nucleoside, nucleotide, or analogue thereof at any position that does not interfere with detection or hybridization as desired. For example, certain Label-On Reagents from Clontech (Palo Alto, Calif.) provide for labeling interspersed throughout the phosphate backbone of an oligonucleotide and for terminal labeling at the 3' and 5' ends. Labels can be attached at positions on the ribose ring or the ribose can be modified and even eliminated as desired. The base moieties of useful labeling reagents can include those that are naturally occurring or modified in a manner that does not interfere with their intended use. Modified bases include but are not limited to 7-deaza A and G, 7-deaza-8-aza A and G, and other heterocyclic moieties.

B. Sample Delivery

The sample can be introduced into the devices of the invention according to standard methods well known to those of skill in the art. Thus, for example, the sample can be introduced into the channel through an injection port such as those used in high pressure liquid chromatography systems. In another embodiment the sample can be applied to a sample well that communicates with the channel In still another embodiment the sample can be pumped into the channel. Means of introducing samples into channels are well known and standard in the capillary electrophoresis and chromatography arts.

C. Fluid Transport

Samples and/or carrier/buffer/wash fluids can be introduced into and/or moved through the channel according to standard methods. For example, fluid can be introduced and moved through the channel by a simple gravity feed from a "reservoir." Alternatively, fluids can be moved through the channel by gas pressure or by fluid pressure produced by any of a variety of suitable pumps (e.g., peristaltic pumps, metering pumps, etc.), pressure on a deformable chamber/diaphragm, etc. Fluid can also be driven through the channel by electrophoretic and/or electroosmotic methods, which are well known and described, for example in U.S. Pat. Nos. 5,632,957 (supra) and U.S. Pat. No. 6,046,056 (supra).

Fluid transport can be continuous or discontinuous. If continuous transport is employed, the fluid velocity is typically set to ensure that the sample remains in contact with each binding partner for a time sufficient for any cognate target analyte to bind. If desired, the assay can employ discontinuous flow, where the sample is moved into contact with a binding partner and maintained in this position for a time sufficient for binding. In one embodiment, the sample is moved into contact with a binding partner and then moved slightly forward and slightly backward (or vice versa) to enhance mixing and bring more target analyte into contact with the binding partner. The "back and forth" movement can be repeated as desired to further enhance mixing.

Electrophoretic and/or electroosmotic methods typically employ electrodes that can be charged positive, negative, or neutral to induce movement and/or concentration of target analytes in the vicinity of one or more binding partners and/or bulk fluid flow through the channel. In a preferred embodiment, the channel includes a plurality of electrodes arranged at distinct binding partner locations along the length of the channel, and a voltage is applied to each electrode in sequence. For example, if the target analytes are nucleic acids, which are negatively charged, a positive DC potential can be applied to each successive electrode, to induce the target analytes to move toward and concentrate near each successive binding partner. The positive potential can be maintained for a time sufficient to enable an appropriate target analyte to bind the binding partner. The polarity at the electrode can then be reversed, to repel unbound target analyte away from the binding partner and on to the next target element.

In a preferred embodiment, the charge polarity at the electrode is reversed several times to mix the target analyte near the electrode; which enhances the diffusion of target analyte to the binding partner, increasing the rate of accumulation of target analyte specifically bound to the binding partner. Charge polarity reversal can optionally be carried out at increasing potential to increase the stringency of the assay (electronic stringency). The process can be carried out until a desired stringency is reached. Stringency can be monitored, for example, by including an internal control in the assay system, i.e., the assay can be run using one or more positive and/or negative control analytes for the binding partner(s) affixed in the channel. Parameters such as the magnitude and duration of the voltage pulse, as well as the number and timing of pulses can be varied to achieve the desired stringency. Gilles et al., (1999) Nature Biotechnology 17:365-370, describe the use of electronic stringency in nucleic acid hybridization assays to remove signal attributable to "mismatch" control probes to background levels.

The rate of fluid transport will depend on the configuration of the device and the kinetics of the binding interaction being assayed. As more rapid assays are generally preferred, device and assay design parameters are usually selected to allow relatively rapid fluid transport. Higher fluid velocities can be employed, if desired, using segmented transport to enhance mixing and to accelerate diffusion of target analytes to binding partners.

D. Segmented Transport

The use of segmented fluid transport in fluidic assay devices is well known and is described, for example, in U.S. Pat. No. 4,853,336 (issued Aug. 1, 1989 to Saros et al.). Successive liquid segments are established in a conduit that are separated from one another by an immiscible fluid. This technique has been used in systems that permit the delayed on-line mixing of different components of an analysis mixture, such as samples with reagents or diluents. Prior to the present invention, segmented fluid transport was used to promote the mixing and interaction of fluid components in a conduit. In the methods of this invention, by contract, this technique is used to enhance the convective mixing of target analyte in a sample moving through a channel and the presentation of target analyte to substrate-affixed binding partners.

Figure 4:
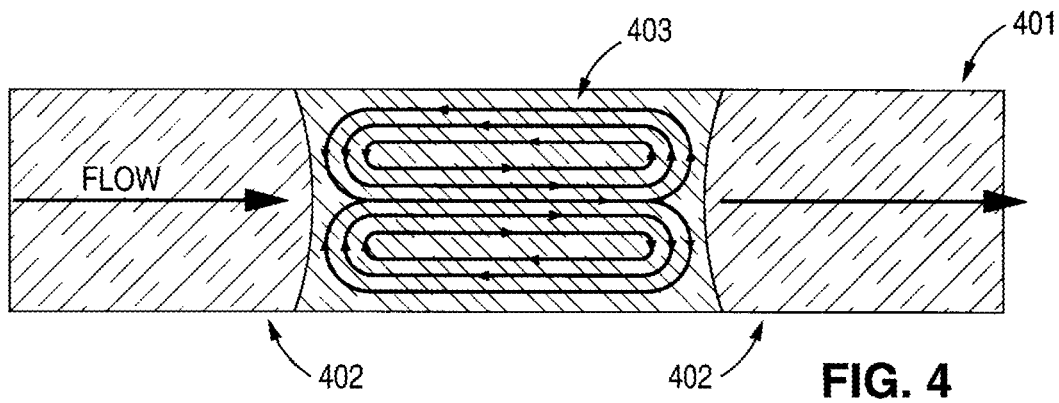
FIG. 4 shows the mixing that occurs in a sample transported through a channel, when the sample is preceded and followed by a bolus or bubble of an immiscible fluid.

FIG. 4 shows an embodiment in which the sample 403 is transported through the channel 401 to a first binding partner with a bolus or bubble of a fluid 402 that is immiscible with the sample preceding the sample during transport. Another bolus or bubble of immiscible fluid 402 follows the sample during transport. The immiscible fluid(s) can be the same or different and a preferably sufficiently immiscible that the sample is substantially maintained as a separate phase during transport. The immiscible fluids can be any fluid that does not contain components reactive with the channel or channel components that the immiscible fluids contact during the assay or with the target analytes, binding partners, or any other assay reagents (e.g., labels). Examples of immiscible fluids suitable for use in the invention include silicon oil and immiscible, non-reactive gases. Gases are preferred, with air bubbles being most conveniently employed.

If the assay requires exposure of the binding elements to more than just the sample solution, e.g., buffers, wash solutions, labeling reagent solutions, etc., each solution can be separated from any other solution by a bolus or bubble of immiscible fluid.

In preferred embodiments, the sample is aqueous solution, and the lumenal surface of the channel is hydrophobic, except for a portion(s) of the channel to which one or more binding partners are affixed. In a particularly preferred embodiment, the assay employs the device of the invention having a cover element with a hydrophilic lumenal surface and channel with a hydrophobic lumenal surface. During transport, there is little carryover of the aqueous sample solution between immiscible fluid-isolated liquid segments. However, a small quantity of sample solution adheres to the hydrophilic binding partner-bearing surface(s). The unbound portion of this carryover sample solution is "picked up" by a following liquid segment, e.g., one containing buffer, and presented to subsequent binding partners. An important advantage of segmented flow is that the segment contents are stirred, as shown in FIG. 4, increasing the amount of target analyte presented to each binding partner.

A preferred embodiment exploits the existence of a thin surface film of sample solution between boluses or bubbles of immiscible fluid and the hydrophilic surface of the channel/cover element to enhance target analyte binding. In the field of Continuous Flow Analysis for which segmented flow was first developed (Skeggs (1957) American Journal of Clinical Pathology 28:311-322), the presence of the surface film between the bubble and the channel wall was considered a cause of undesirable carryover from one liquid segment to the following liquid segment. However, the present invention can take advantage of this carryover to provide "thin-film" presentation of target analytes to binding partners. As liquid segments and boluses or bubbles move past, the surface film is caught between the bolus/bubble and the hydrophilic surface and then moves from one liquid segment into the next liquid segment. The thickness of the film formed between the bolus/bubble and the hydrophilic surface is defined by the following equation:

$$d_f = 0.5 \pi d_t (u \eta / \gamma)^{2/3}$$

where $d_f$=thickness of film; $d_t$=diameter of tube; u=velocity of flow; η=viscosity; γ=surface tension. See Snyder and Adler (1976) *Anal. Chem.* 48:1018-22; Snyder and Adler (1976) *Anal. Chem.* 48:1023-27.

Figure 5:
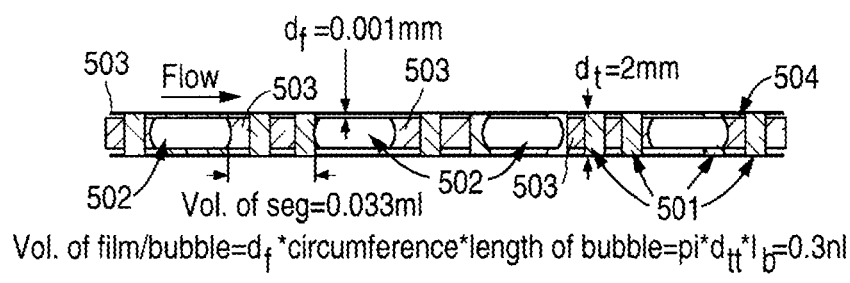
FIG. 5 illustrates an embodiment of the invention in which the presentation of target analyte to binding partners affixed to a channel is enhanced by the formation of a thin film of sample solution containing the target analyte between a bolus or bubble of immiscible fluid following the sample.

FIG. 5 illustrates the situation in which the film captured between bolus or bubble 502 and the hydrophilic surface of channel 504 is caught up by and mixes with following liquid segment 503. (Binding partners 501 are also shown.) As is apparent from the above equation, the thickness of the surface film can be manipulated by the surface tension, the viscosity of the sample solution and by the velocity of flow. With the control available, the sample solution can be presented to binding partner(s) in a film sufficiently thin, on the order of 1 μm, that target analyte diffusion to the hydrophilic surface is rapid.

Figure 6:
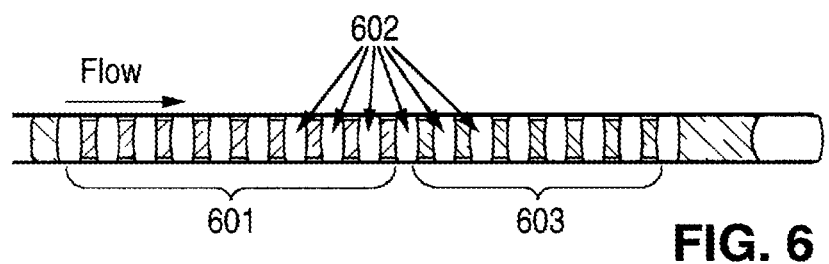
FIG. 6 shows an embodiment of the invention in which a bolus of sample solution is divided into segments by boluses or bubbles of immiscible fluid, as is a bolus of buffer solution following the sample solution.

FIG. 6 illustrates the use of multiple boluses or bubbles of immiscible fluid 602 to increase the proportion of the sample 603 presented as a thin film and to increase the exchange of bulk solution in the sample bolus with the thin film between the bolus/bubble and the lumenal surface. The sample solution 603 is divided into a number of segments separated by small boluses/bubbles 602. As the segmented flow moves down the channel, target analyte in the film adhering to the hydrophilic surface that has not hybridized to a binding partner, is carried from the leading sample segment into the following segment, mixing with it. This transfer and mixing reoccurs between each adjacent sample segment, efficiently mixing the segments and exposing the target elements to fresh sample solution in a thin film. The transfer of sample solution from one liquid segment to the next results in a slow dilution of the target analyte as the column of sample solution segments moves down the tube. However, buffer solution 601 following sample 603 can capture unbound target analyte and re-present it to the binding partners. Preferably, buffer solution 601 is divided into a number segments separated by a bolus or bubble of immiscible fluid 602, as shown in FIG. 6.

Thin-film presentation of target analyte makes it possible to run the assay at relatively high flow velocities. One of skill in the art can readily determine suitable flow velocity by calculating the amount of time required for a target analyte to diffuse to and bind its cognate binding partner. For example, the flow velocity for a nucleic acid hybridization assay can be calculated as follows. If the target analyte is a 15-bp oligonucleotide, it has a length of 15*0.34 nm/bp, a diameter of 2.6 nm and a volume of $15*0.34 \text{ nm}*(1.3 \text{ nm})^2*\pi=27.1 \text{ nm}^3$. A sphere of equal volume has a radius of $R=(3/(4\pi)*V)^{1/3}=1.86$ nm, and the lateral diffusion coefficient of a sphere (D) is δγηπ.

$$D=kT/(6\pi\eta R)$$

(η water, 20° C.)=0.01 Poise (poise=g/cm s)

$$D=1.38*10^{-16} \text{ erg/K}*293\text{K}/(6*\pi*0.01 \text{ g/(cm s)}*1.86*10^{-7} \text{cm}=1.15*10^{-6} \text{ cm}^2/\text{s}$$

And the distance diffused is:

$$d=(2Dt)^{1/2}$$

and $$t=d^2/2D$$

Thus for a 15-mer to diffuse 1 μ:

t=0.005 sec.

Consequently, once a 1 μm thick film of sample solution has formed between a bubble and a surface, a 15-mer will require only 5 msec to diffuse to the surface and be within hybridization reach of target sequences.

Given a diffusion time of 5 msec, a 1-mm long sample could move at a velocity of 1 mm/0.005 sec or 200 mm/sec. Allowing 100 diffusion times for hybridization to occur gives a flow velocity of 2 mm/sec. Thus, segmented flow through a channel will efficiently present target analytes to the binding partners in a 10,000-binding partner channel in about 1-2 hours. Of course, where assay time is not a concern, assays of the invention can be run at lower flow velocities, e.g., about 10 mm/sec, about 1 mm/sec, about 0.1 mm/sec, about 0.01 mm/sec, and about 0.001 mm/sec.

E. Segmented Electrophoretic Transport

In some embodiments, fluid transport is combined with electrophoretic transport. Use of segmentation allows precise control over the positioning of the sample or sample segment relative to the binding partner(s) and the corresponding electrode(s). Fluid transport can thus be coordinated so that an electrode serving a binding partner location is appropriately charged (i.e., positively or negatively, depending on the target analyte charge) when the sample or sample segment is positioned over that binding element. By setting the size of the immiscible fluid bolus or bubble so that it spans several electrodes, the electric field is confined to the target segment of interest preventing electric current and electrolysis from occurring where it is not useful. In this embodiment, one or more sensors (e.g., optical sensors) can be employed to follow the progress of the sample and to switch on the electrodes when appropriate.

F. Other Methods of Enhancing Target Analyte Mixing

In addition to the method described above, mixing and presentation of target analyte, or other assay components, to binding partners can be enhanced by including particles in the relevant fluids. A preferred embodiment includes particles in the sample and/or in a buffer solution transported through the channel after the sample. The particles should be non-reactive with the assay and device components that the particles will contact in use. The particles can be formed of any of the materials described above with respect to channel materials, as well as other materials known to those of skill in the art. Polymeric particles are preferred and are available in a variety of shapes and sizes. The particles should be sized to enhance mixing. In embodiments employing segmented flow, the particles must not be so large as to disrupt the boluses or bubbles of immiscible fluid. In a preferred embodiment, the channel has a half-circular shape, an internal diameter of about 100 μm, and particles that are about 5 μm to about 20 μm, preferably about 10 μm to about 15 μm, are included in the sample solution to enhance mixing.

Mixing can also be enhanced by appropriate channel design. For example, the channel can include one or more irregularities or obstacles to flow, such as e.g. bumps, that induce turbulence. In devices designed for segmented flow, the size and shape of such irregularities or obstacles should allow boluses or bubbles of immiscible fluid to pass by intact. In a half-circular channel having an internal diameter of about 100 μm, for example, the channel can include one or more bumps extending about 15 μm to about 25 μm, preferably about 20 μm from the channel wall. If desired, such irregularities can be spaced a set distance before binding partner locations to provide mixing specifically where it is need.

G. Binding Conditions

Once in the channel, the sample is held under conditions that promote specific binding between the sample and the binding partner. Conditions compatible with specific binding between a binding partner and a given target analyte are well known to those of skill in the art. For example, buffers suitable for promoting binding between an antibody and a target protein are well known in the immunoassay art (see, e.g., U.S. Pat. Nos. 4,366,241; 4,376,110; 4,517,288; and 4,837,168; Asai (1993) *Methods in Cell Biology Volume* 37: *Antibodies in Cell Biology,* Academic Press, Inc. New York; Stites & Terr (1991) *Basic and Clinical Immunology* 7th Edition).

Similarly conditions under which nucleic acids specifically hybridize to each other are also well known to those of skill in the art. (see, e.g., Tijssen (1993) *Laboratory Techniques in Biochemistry and Molecular Biology, Vol.* 24: *Hybridization With Nucleic Acid Probes,* Elsevier, N.Y.).

Nucleic acid hybridization simply involves contacting single-stranded nucleic acids under conditions where complementary nucleic acids can form stable hybrid duplexes through complementary base pairing. The nucleic acids that do not form hybrid duplexes are then washed away leaving the hybridized nucleic acids to be detected, typically through detection of an attached detectable label. It is generally recognized that nucleic acids are denatured by increasing the temperature or decreasing the salt concentration of the buffer containing the nucleic acids, adding chemical agents, or the raising the pH. Under low stringency conditions (e.g., low temperature and/or high salt) hybrid duplexes (e.g., DNA:DNA, RNA:RNA, or RNA:DNA) will form even where the annealed sequences are not perfectly complementary. Thus specificity of hybridization is reduced at lower stringency. Conversely, at higher stringency (e.g., higher temperature or lower salt) successful hybridization requires fewer mismatches.

One of skill in the art will appreciate that hybridization conditions may be selected to provide any degree of stringency. In a preferred embodiment, hybridization is performed at low stringency to ensure hybridization and then subsequent washes are performed at higher stringency to eliminate mismatched hybrid duplexes. Successive washes may be performed at increasingly higher stringency (e.g., down to as low as 0.25×SSPE at 37° C. to 70° C.) until a desired level of hybridization specificity is obtained. Stringency can also be increased by addition of agents such as formamide. Finally, electronic stringency can be employed as described above to achieve the desired stringency. Hybridization specificity can be evaluated by comparing hybridization of target analyte nucleic acids with hybridization of control nucleic acids that can be included in the hybridization mixture.

In general, there is a tradeoff between hybridization specificity (stringency) and signal intensity. Thus, in a preferred embodiment, the wash is performed at the highest stringency that produces consistent results and that provides a signal intensity greater than approximately 10% of the background intensity. This stringency can be determined empirically by washing the hybridized target analyte nucleic acids with successively higher stringency solutions and detecting binding after each wash. Analysis of the data sets thus produced will reveal a wash stringency above which the hybridization pattern is not appreciably altered and which provides adequate signal for the assay.

In a preferred embodiment, background signal is reduced by the use of a blocking reagent (e.g., tRNA, sperm DNA, Cot-1 DNA, etc.) during the hybridization to reduce non-specific binding. The use of blocking agents in hybridization is well known to those of skill in the art (see, e.g., Chapter 8 in P. Tijssen, supra).

Optimal hybridization conditions are also a function of the sensitivity of label (e.g., fluorescence) detection for different combinations of substrate type, fluorochrome, excitation and emission bands, spot size and the like. Low fluorescence background surfaces can be used (see, e.g., Chu (1992) *Electrophoresis* 13:105-114). The sensitivity for detection of binding partner spots of various diameters on the candidate surfaces can be readily determined by, e.g., spotting a dilution series of fluorescently end labeled DNA fragments. These spots are then imaged using conventional fluorescence microscopy. The sensitivity, linearity, and dynamic range achievable from the various combinations of fluorochrome and solid surfaces (e.g., glass, fused silica, etc.) can thus be determined. Serial dilutions of pairs of fluorochrome in known relative proportions can also be analyzed. This determines the accuracy with which fluorescence ratio measurements reflect actual fluorochrome ratios over the dynamic range permitted by the detectors and fluorescence of the substrate upon which the binding partner has been fixed.

H. Detection

Virtually any method of analyte detection can be used in accordance with the methods of this invention. Methods of detecting target analytes are well known to those of skill in the art. Where the target analyte is labeled, the analyte is detected by detecting the label. Alternatively, binding of the target analyte can be detected by detecting a physical property of the target analyte. Preferably, the detection method employed is one that allows quantification of target analyte binding.

Since the identity of target analytes can determined by the location(s) the binding partner(s) to which they bind, there is no need to use different labels to identify different analytes. Target analytes can be directly or indirectly labeled. Indirect labeling most typically entails the use of labeled component capable of binding to the target analyte, e.g., a labeled antibody. The labeled component can be a member of a binding pair, the other member of which is attached to the target analyte, e.g., biotin-avidin. Where indirect labeling is employed, binding between the labeled component and the target analyte can occur before, during or after binding of the target analyte to the binding partner affixed in the channel. The label can be detectable throughout the assay procedure or can be detectable as a result of interaction with a detection system that is delivered in a bolus of fluid that follows the sample and any buffer or wash solutions.

Methods of detecting target analytes are well known to those of skill in the art. Where the target analyte is labeled (e.g., with a radioactive, fluorescent, magnetic, or mass label), the analyte is detected by detecting the label. Preferably, the target analyte(s) present in the sample are labeled with a light-absorbing label, such as a fluorescent label.

Figure 7:
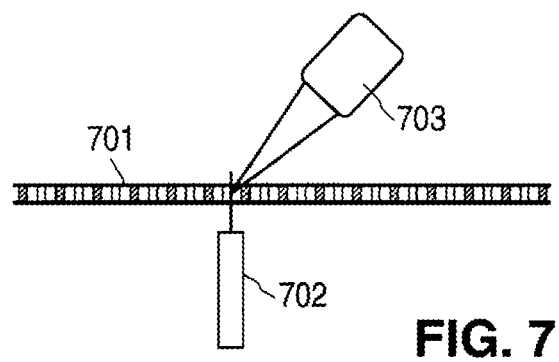
FIG. 7 illustrates fluorescence detection of labeled target analytes bound to cognate binding partners in a capillary tube.

Fluorescent labels are conveniently detected using a standard reader including an excitation light source and a fluorescence detector. A conventional reader can include, for example, a mercury arc lamp and a CCD camera to collect fluorescence intensity data (see, e.g., Pinkel et al. (1998) *Nature Genetics* 20:207-211). Multiple filters are typically employed to collect intensity data for different fluorophores. Where the channel is a tube, such as a capillary tube, fluorescent detection can be carried out by passing the channel 701 through a reader, as shown in FIG. 7, where the light source 702 provides excitation light, and the resulting fluorescence signal is detected by a detector 703. Suitable systems are available for analyzing fluorescence signals on two-dimensional microarrays, and these can be used to detect and quantify binding to a two-dimensional array of binding partners spotted on a cover element of the invention.

Depending on the detection method, a detector or component of a detection system can be incorporated into a device of the invention. Alternatively, the surface of the device bearing the target analyte-bound binding partners can be removed from the channel to facilitate detection. For example, if the binding partners are affixed to the cover element, the cover element can be unsealed from the channel and signal detected using any detection system suitable for detecting binding to microarrays, e.g., DNA microarrays.

Although assays of the invention tan be used to detect multiple target analytes without the need for multiple labels, for some applications, multiple labels may be desirable. For example, the assays of the invention can be used for comparative assays in which the sample includes target analytes derived from two or more different sources. The target analytes from each source are labeled with a different label. The different labels should be readily distinguishable. For instance, target analyte derived from one source could have a green fluorescent label, and target analyte derived from another source could have a red fluorescent label. The detection step distinguishes sites binding the red label from those binding the green label. In this manner the binding of differently labeled target analytes to a single binding partner can be analyzed independently from one another.

The differently labeled target analytes can be mixed to form a sample that is introduced into the channel as described above. Alternatively, the target analytes from one source can be introduced into the channel as a first sample, followed by introduction of the target analytes from any other sources as separate samples. After binding to channel-affixed binding partners, the signals from the labeled target analytes bound each binding partner are detected. The intensities of any signal produced by each different label at each binding partner location are compared as an indication of the relative amounts of each type of target analyte in the original sources.

I. Comparative Genomic Hybridization/Expression Monitoring

In a preferred embodiment, a device according to the invention is used in a Comparative Genomic Hybridization (CGH) or expression monitoring assay. CGH is a approach used to detect the presence and identify the chromosomal location of amplified or deleted nucleotide sequences. (See, Kallioniemi et al., Science 258: 818-821 (1992); WO 93/18186.) In the traditional implementation of CGH, genomic DNA is isolated from normal reference cells, as well as from test cells (e.g., tumor cells). The two nucleic acids (DNA) are labeled with different labels and then hybridized in situ to metaphase chromosomes of a reference cell. The repetitive sequences in both the reference and test DNAs can be removed or their hybridization capacity can be reduced by some means such as an unlabeled blocking nucleic acid (e.g. Cot-1). Chromosomal regions in the test cells that are at increased or decreased copy number can be quickly identified by detecting regions where the ratio of signal from the two DNAs is altered. For example, those regions that have been decreased in copy number in the test cells will show relatively lower signal from the test DNA than the reference compared to other regions of the genome. Regions that have been increased in copy number in the test cells will show relatively higher signal from the test DNA.

In one embodiment, the present invention provides a CGH-type assay in which the device of the present invention replaces the metaphase chromosome used for hybridization target in traditional CGH. Instead, the binding partners affixed in the channel are nucleic acid sequences selected from different regions of the genome. The device itself becomes a sort of "glass chromosome" where hybridization of a nucleic acid to a particular binding partner is informationally equivalent to hybridization of that nucleic acid to the region on a metaphase chromosome from which the binding partner is derived. In addition, nucleic acid binding partners not normally contained in the genome, for example viral nucleic acids, can be employed.

More particularly, in a CGH-type assay, device of the invention can be utilized in methods for quantitatively comparing copy numbers of at least two nucleic acid sequences in a first collection of nucleic acids relative to the copy numbers of those same sequences in a second collection. The binding partners for these nucleic acids can be any type of nucleic acid, e.g., genomic DNA, cDNA, amplified DNA, synthetic DNA, or RNA (particularly mRNA), as can the collections of nucleic acids. In preferred embodiments, the nucleic acid collections are genomic DNA, or representations thereof (e.g., amplified sequences), and the copy number comparison yields information about copy number variations (i.e., amplifications and/or deletions) between the two nucleic acid collections. In other preferred embodiments, the nucleic acid collections are mRNA, or representations thereof (e.g., cDNA or amplified sequences), and the copy number comparison yields information about differences in levels of expression of particular genes between the two nucleic acid collections. Similar types of comparative assays can be performed by binding collections of proteins from different sources to channel-affixed antibodies or other binding proteins. Such embodiments are useful in expression monitoring studies.

If repetitive sequences are present in the hybridization mixture formed when the nucleic acid collection(s) contact channel-affixed nucleic acid binding partners, unlabeled blocking nucleic acids (e.g., Cot-1 DNA) can be included in the hybridization mixture. The blocking of repetitive sequence hybridization allows detection of so-called "unique sequence" copy number variation. Blocking nucleic acids can be mixed with the nucleic acid collections before introduction into the channel. Alternatively, a solution of blocking nucleic acids can precede a bolus or bubble of immiscible fluid preceding the sample.

In a typical embodiment, one collection of nucleic acids is prepared from a test cell, cell population, or tissue under study; and the second collection of nucleic acids is prepared from a reference cell, cell population, or tissue. Reference cells can be normal non-diseased cells, or they can be from a sample of diseased tissue that serves as a standard for other aspects of the disease. For example, if the reference nucleic acids are genomic DNA isolated from normal cells, then the copy number of each sequence in that genomic DNA relative to the others is known (e.g., two copies of each autosomal sequence, and one or two copies of each sex chromosomal sequence depending on gender). Comparison of this to test nucleic acids permits detection of variations from normal. Alternatively the reference nucleic acids can be prepared from genomic DNA from a primary tumor that may exhibit substantial copy number variations, and the test nucleic acids can be prepared from genomic DNA of metastatic cells from that tumor, so that the comparison shows the differences between the primary tumor and its metastasis. Further, both collections of nucleic acids can be prepared from normal cells. For example comparison of mRNA populations between normal cells of different tissues permits detection of differential gene expression that is a critical feature of tissue differentiation. Thus, the terms "test" and "reference" are used for convenience to distinguish the two collections of nucleic acids; neither term is intended to imply anything about the characteristics of the nucleic acids.

VI. Kits for Multiple Analyte Detection

In one embodiment, the invention provides kits for screening for, identifying the presence or absence, and/or quantifying one or more analytes in a sample. A kit of the invention includes a channel of the invention including one or more binding partners affixed therein as described above. The channel is preferably designed for simple and rapid incorporation into an integrated assay device, e.g., a device including one or more of the following: sample application well(s) and/or injection port(s), one or more reservoirs to provide buffers and/or wash fluids, one or more electrodes that direct fluid transport, a detector, a computer controller. The kit can additionally include appropriate buffers and other solutions and standards for use in the assay methods described herein.

In addition, a kit can include instructional materials containing directions (i.e., protocols) for the practice of the methods of this invention. While the instructional materials are typically written or printed materials, they ate not limited to such. Any medium capable of storing such instructions and communicating them to an end user is contemplated by this invention. Such media include, but are not limited to, electronic storage media (e.g., magnetic discs, tapes, cartridges, chips), optical media (e.g., CD ROM), and the like. Such media may include addresses to internet sites that provide such instructional materials.

All publications cited herein are incorporated by reference in their entirety.

EXAMPLES

The following examples are offered to illustrate, but not to limit, the claimed invention.

Example 1

Capillary-Based Array Hybridization System

Figure 8:
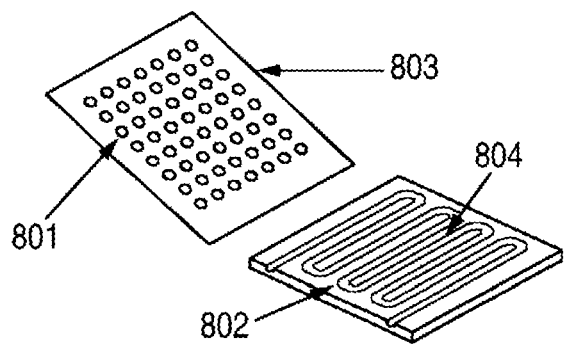
FIG. 8 is a schematic illustration of a device according to the invention in which nucleic acid binding partners are affixed to a planar cover element, which is attached to a substrate including a channel. This device is described in Example 1.

A capillary channel-based array hybridization system is illustrated in FIG. 8. The channel substrate 802 is composed of molded PDMS (polydimethylsiloxane) material, which can be molded with precise detail and which provides a surface readily sealed against the planar cover element (coverplate) 803. The channel 804 has a half-circular cross section. To minimize the amount of target analyte required for analysis and to minimize the distances through which target analytes must diffuse to reach binding partners, the channel has an internal diameter of 100 μm and a total length of 1 m. The channel is folded 100 times, the distance between the center of one channel segment and the center of an adjacent channel sequence is 400 μm, and the channel substrate is 4 cm×10 cm.

The coverplate is glass. Nucleic acid binding partners. 801 are printed on the coverplate with using a robotic arrayer robot conventionally used for production of standard 2-dimensional DNA microarrays. The center-to center distance between adjacent binding partners in the same row is approximately 100 μm (rows run along the longitudinal axis of each channel segment when the coverplate is sealed over the channel. The center-to-center distance between adjacent binding partners in the same column is approximately 400 μm (columns are perpendicular to the rows). This approach has the advantage that existing facilities can implement the capillary-array analysis strategy using existing array equipment. The coverplate can be easily removed for fluorescence analysis, and the flow channel can be reused multiple times.

A capillary-array CGH hybridization assay is carried out as described previously for array CGH. Briefly, genomic DNA from a test source is labeled by nick translation with fluorescein dCTP, and reference genomic DNA is labeled by nick translation with Texas red dCTP. The labeled DNAs are mixed with excess unlabeled Cot-1 DNA and precipitated with ethanol. The precipitated DNA is resuspended in 50% formamide, 10% dextran sulfate, 2×SSC, 2% sodium dodecyl sulfate (SDS) and 100 mg tRNA. The DNA is denatured at 70° C. and transported through the capillary channel at 37° C. After hydridization, the coverplate is removed and washed in 50% formamide, 2×SSC, pH7, at 45° C. and once in 0.1 M sodium phosphate buffer with 0.1% NP40, pH 8, at room temperature. Green/red fluorescence ratios are measured using an ACAS 570, confocal, scanning-laser system.

Example 2

Capillary-Based Array Electrophoretic Hybridization System

Figure 9:
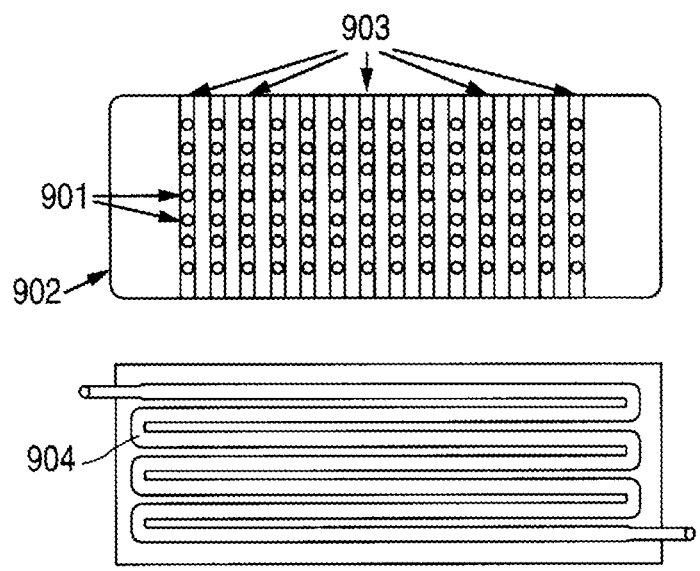
FIG. 9 is an illustration of a modified version of the device of FIG. 8, which includes electrodes positioned under the nucleic acid binding elements to provide electrophoretic enhancement of hybridization. This device is described in Example 2.

Referring to FIG. 9, a device having the basic configuration described in Example 1 has nucleic acid binding partners 901 printed in a 2-dimensional array on a glass coverplate 902 on top of titanium-platinum electrodes 903. The electrodes 903 underlie a column of different binding partner locations in the 2-dimensional array. Each column of different binding partner locations has a long axis that is generally perpendicular to the longitudinal axis of each straight segment of the channel 904. To protect the nucleic acids from electrolysis products formed at the electrodes, the coverplate surface, including the conducting strips, are coated with a permeation layer comprised of 2% glyoxal agarose and 1 mg/ml streptavidin mixture. The nucleic acid binding partners are synthesized with a biotin attached to one end. Once the binding partners are deposited on the permeation layer, avidin/biotin binding affixes the nucleic acids, forming binding partner elements.

In use, a positive DC potential is applied to successive electrode strips along the channel to attract negatively charged target nucleic acids to each successive binding partner along the capillary, presenting target nucleic acids to each nucleic acid binding partner for hybridization. The polarity is then reversed to repel unhybridized material, which then moves to the next binding partner in response the positive DC potential at its associated electrode. Preferably, the potential is reversed several times at each electrode to "mix" the probe and to define an electric "stringency" of hybridization.

What is claimed is:
1. A method of producing an array of binding partners, comprising:
   introducing a bolus of a first binding partner into a channel;
   introducing a bolus or bubble of an immiscible fluid into said channel after said first binding partner;
   introducing a bolus of a second binding partner into said channel after said immiscible fluid, wherein said channel is a loading tube with a hydrophobic lumenal surface and each binding partner bolus is encapsulated in oil, additionally comprising:
   inserting said loading tube into an assay tube;
   transferring said first and second binding partners, separated by said bolus or bubble of immiscible fluid, into said assay tube;
   affixing said first and second binding partners to a lumenal surface of said assay tube at distinct locations; and
   withdrawing said loading tube from said assay tube, thereby producing an array of binding partners.

2. The method of claim 1, wherein said assay tube has a cross-sectional diameter of about 100 μm or less.

3. The method of claim 1, wherein said first binding partner is selected from the group consisting of an antibody, a binding protein, and a nucleic acid.

4. The method of claim 1, wherein said channel is molded in a polymeric material.

5. The method of claim 4, wherein said polymeric material is a polydimethylsiloxane.

6. The method of claim 1, wherein at least about 100 different binding partners are affixed to distinct locations of said assay tube.

7. The method of claim 1, wherein a cover element overlies and seals said channel and has a first surface facing the channel lumen.

8. The method of claim 7, wherein said first surface of said cover element is hydrophilic.

9. A method of producing an array of binding partners, comprising:
   introducing a bolus of a first binding partner into a loading tube;
   introducing a first bolus or bubble of an immiscible fluid into said loading tube after said first binding partner;
   introducing a first bolus of a cross linking reagent into said loading tube after said first bolus or bubble of an immiscible fluid;
   inserting the loading tube into a larger diameter assay tube, wherein the first bolus or bubble of an immiscible fluid is too small to span the larger diameter of the assay tube, thereby allowing for mixing of the first binding partner and the cross linking reagent;
   affixing the first binding partner to the assay tube;
   introducing a second bolus or bubble of an immiscible fluid into said loading tube;
   introducing a bolus of a second binding partner into said loading tube;
   introducing a third bolus or bubble of an immiscible fluid into said loading tube after said second binding partner;
   introducing a second bolus of a cross linking reagent into said tube after said third bolus or bubble of an immiscible fluid;
   inserting the loading tube into the larger diameter assay tube, wherein the third bolus or bubble of an immiscible fluid is too small to span the larger diameter of the assay tube, thereby allowing for mixing of the second binding partner and the cross linking reagent; and
   affixing the second binding partner to the assay tube, thereby producing the array of binding partners.

10. The method of claim 9, wherein the first and second binding partners are affixed to the assay tube at distinct locations.

11. The method of claim 9, wherein said assay tube has a cross-sectional diameter of about 100 μm or less.

12. The method of claim 9, wherein said first binding partner is selected from the group consisting of an antibody, a binding protein, and a nucleic acid.

13. The method of claim 9, wherein said assay tube is molded in a polymeric material.

14. The method of claim 13, wherein said polymeric material is a polydimethylsiloxane.

15. The method of claim 9, wherein at least about 100 different binding partners are affixed to distinct locations of said assay tube.

16. The method of claim 9, wherein a cover element overlies and seals said assay tube and has a first surface facing the assay tube lumen.

17. The method of claim 16, wherein said first surface of said cover element is hydrophilic.

* * * * *